United States Patent
Sun et al.

(10) Patent No.: US 11,558,174 B2
(45) Date of Patent: Jan. 17, 2023

(54) DATA STORAGE METHOD, DEVICE, RELATED EQUIPMENT AND CLOUD SYSTEM FOR HYBRID CLOUD

(71) Applicant: Tencent Technology (Shenzhen) Company Limited, Shenzhen (CN)

(72) Inventors: Bin Sun, Shenzhen (CN); Jian Wang, Shenzhen (CN); Jie Li, Shenzhen (CN); Xianbin Wu, Shenzhen (CN); Yupeng Qu, Shenzhen (CN); Ailing Wei, Shenzhen (CN); Shu Cai, Shenzhen (CN); Youlan Gong, Shenzhen (CN); Lihu Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 45 days.

(21) Appl. No.: 16/743,868

(22) Filed: Jan. 15, 2020

(65) Prior Publication Data

US 2020/0153604 A1 May 14, 2020

Related U.S. Application Data

(63) Continuation of application No. PCT/CN2018/096072, filed on Jul. 18, 2018.

(30) Foreign Application Priority Data

Jul. 19, 2017 (CN) .......................... 201710591062.8

(51) Int. Cl.
*H04L 9/06* (2006.01)
*G06F 16/958* (2019.01)
(Continued)

(52) U.S. Cl.
CPC .......... *H04L 9/0618* (2013.01); *G06F 16/958* (2019.01); *G06F 21/602* (2013.01); *H04L 9/14* (2013.01)

(58) Field of Classification Search
CPC ....... H04L 9/0618; H04L 9/14; G06F 16/958; G06F 21/602
See application file for complete search history.

(56) References Cited

U.S. PATENT DOCUMENTS

2010/0332401 A1* 12/2010 Prahlad ............... H04L 63/0428
705/80
2011/0246766 A1* 10/2011 Orsini ................. G06F 21/6218
713/160
(Continued)

FOREIGN PATENT DOCUMENTS

| CN | 105260668 A | 1/2016 |
|---|---|---|
| CN | 105283879 A | 1/2016 |

(Continued)

OTHER PUBLICATIONS

Tencent Technology, ISRWO, PCT/CN2018/096072, dated Sep. 26, 2018, 7 pgs.
(Continued)

*Primary Examiner* — Kristine L Kincaid
*Assistant Examiner* — Zoha Piyadehghibi Tafaghodi
(74) *Attorney, Agent, or Firm* — Morgan, Lewis & Bockius LLP

(57) ABSTRACT

Embodiments of this application provide a hybrid-cloud data storage method and apparatus, a related device, and a cloud system. The data storage method includes: obtaining, by a gateway of a private cloud, to-be-stored data; determining partial data to be encrypted in the to-be-stored data, to obtain first target data; obtaining a first ciphertext obtained after the first target data is encrypted, the first target data being encrypted according to a first key provided by an encryption
(Continued)

chip connected to the gateway; generating second target data including the first ciphertext according to the first ciphertext; generating a data slice corresponding to the second target data according to the second target data; and transmitting the data slice corresponding to the second target data to a public cloud for storage.

17 Claims, 9 Drawing Sheets

(51) Int. Cl.
*G06F 21/60* (2013.01)
*H04L 9/14* (2006.01)

(56) References Cited

U.S. PATENT DOCUMENTS

| | | | |
|---|---|---|---|
| 2013/0168450 A1* | 7/2013 | von Mueller | H04L 9/0618 235/449 |
| 2015/0052360 A1* | 2/2015 | Ravishankar | H04L 63/0428 713/171 |
| 2015/0365382 A1 | 12/2015 | Balakrishnan et al. | |
| 2016/0055347 A1* | 2/2016 | Park | G06F 21/602 713/165 |
| 2016/0062918 A1* | 3/2016 | Androulaki | H04L 9/0861 713/193 |
| 2016/0147471 A1* | 5/2016 | O'Hare | G06F 3/067 713/171 |
| 2016/0219024 A1* | 7/2016 | Verzun | H04L 63/102 |
| 2016/0267291 A1* | 9/2016 | Androulaki | G06F 3/0641 |
| 2016/0330177 A1 | 11/2016 | Singleton, IV et al. | |
| 2017/0026355 A1 | 1/2017 | Mathaiyan et al. | |
| 2017/0104736 A1 | 4/2017 | Seul et al. | |
| 2017/0132158 A1* | 5/2017 | Axnix | H04L 9/14 |

FOREIGN PATENT DOCUMENTS

| | | |
|---|---|---|
| CN | 106100824 A | 11/2016 |
| CN | 106209823 A | 12/2016 |
| CN | 106936820 A | 7/2017 |
| CN | 107330337 A | 11/2017 |
| WO | WO 2015122874 A1 | 8/2015 |

OTHER PUBLICATIONS

Tencent Technology, IPRP, PCT/CN2018/096072, dated Jan. 21, 2020, 6 pgs.

* cited by examiner

DATA STORAGE METHOD, DEVICE, RELATED EQUIPMENT AND CLOUD SYSTEM FOR HYBRID CLOUD

CROSS-REFERENCE TO RELATED APPLICATIONS

This application is a continuation application of PCT/CN2018/096072, entitled "HYBRID-CLOUD DATA STORAGE METHOD AND APPARATUS, RELATED DEVICE, AND CLOUD SYSTEM" filed on Jul. 18, 2018, which claims priority to Chinese Patent Application No. 201710591062.8, entitled "HYBRID-CLOUD DATA STORAGE METHOD AND APPARATUS, RELATED DEVICE, AND CLOUD SYSTEM", and filed with the China National Intellectual Property Administration on Jul. 19, 2017, all of which are incorporated herein by reference in their entirety.

FIELD OF THE TECHNOLOGY

This application relates to the field of data processing technologies, and in particular, to a hybrid-cloud data storage method and apparatus, a related device, and a cloud system.

BACKGROUND OF THE DISCLOSURE

A hybrid cloud refers to a combination of a public cloud and a private cloud, and has become one of the main modes and development directions of cloud computing. The public cloud is a computing resource provided by a public cloud service provider, may be used by all network users, and is a cloud environment that may be shared and used by all enterprises and users. The private cloud is a cloud environment dedicated to specific users for security reasons. For example, resources in a private cloud built for an enterprise are only available to internal users of the enterprise, or specific external users related to the enterprise.

SUMMARY

An embodiment of this application provides a hybrid-cloud data storage method, applied to a gateway having one or more processors and memory storing a plurality of programs to be executed by the one or more processors, the method including:
  obtaining to-be-stored data;
  determining partial data to be encrypted in the to-be-stored data, to obtain first target data;
  encrypting the first target data according to a first key provided by an encryption chip connected to the gateway;
  obtaining a first ciphertext obtained after the first target data is encrypted;
  generating second target data comprising the first ciphertext;
  generating a data slice corresponding to the second target data; and
  transmitting the data slice corresponding to the second target data to a public cloud for storage.

An embodiment of this application further provides a gateway comprising one or more processors, memory coupled to the one or more processors and a plurality of programs stored in the memory that, when executed by the one or more processors, cause the gateway to perform the aforementioned hybrid-cloud data storage method.

An embodiment of this application further provides a non-transitory computer readable storage medium storing a plurality of machine readable instructions in connection with a gateway having one or more processors, wherein the plurality of machine readable instructions, when executed by the one or more processors, cause the gateway to perform the aforementioned hybrid-cloud data storage method.

BRIEF DESCRIPTION OF THE DRAWINGS

To describe the technical solutions in the embodiments of this application or in the related art more clearly, the following briefly describes the accompanying drawings required for describing the embodiments or the related art. Apparently, the accompanying drawings in the following description show merely the embodiments of this application, and a person of ordinary skill in the art may still derive other drawings from the provided drawings without creative efforts.

DESCRIPTION OF EMBODIMENTS

The technical solutions in the embodiments of this application are clearly described in the following with reference to the accompanying drawings. Apparently, the embodiments to be described are merely a part rather than all of the embodiments of this application. All other embodiments obtained by a person of ordinary skill in the art based on the embodiments of this application without creative efforts shall fall within the protection scope of this application.

Figure 1:
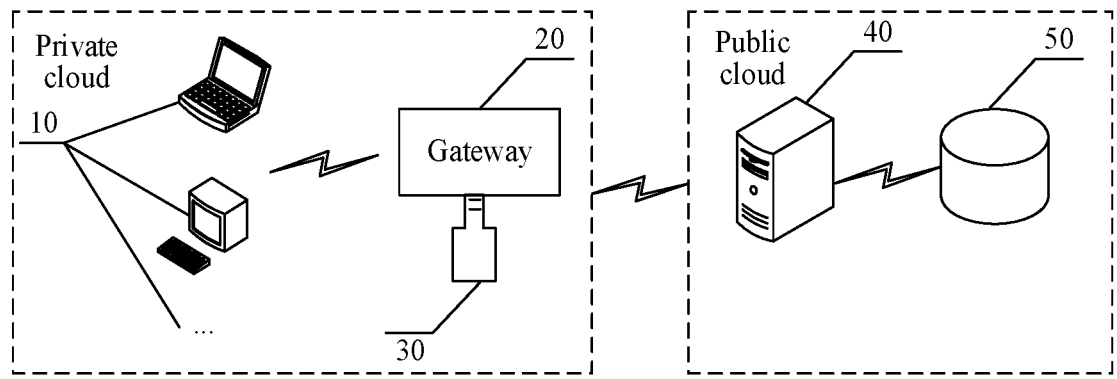
FIG. 1 is an architectural block diagram of a hybrid-cloud cloud system according to an embodiment of this application.

FIG. 1 is a block diagram of a hybrid-cloud cloud system according to an embodiment of this application. The cloud system shown in FIG. 1 may implement a hybrid-cloud data storage method provided in the embodiments of this application, to achieve the purpose of improving the security of data of a private cloud that is stored in a public cloud.

Referring to FIG. 1, the cloud system includes: at least one terminal device 10, a gateway 20, an encryption chip 30, a storage change server 40, and a storage device 50. The at least one terminal device 10, the gateway 20, and the encryption chip 30 are located in a private cloud, and the storage change server 40 and the storage device 50 are located in a public cloud. The private cloud and the public cloud may communicate through a specific security protocol, for example, a secure sockets layer (SSL) protocol.

As shown in FIG. 1, the at least one terminal device 10 in the private cloud may be regarded as a terminal device with data storage and read-write requirements in the private cloud. A form of the terminal device 10 may not be limited to at least one type of user-side electronic device such as a smartphone, a tablet computer, or a personal computer (PC). In this embodiment of this application, the at least one terminal device 10 in the private cloud may be in communications connection with the gateway 20 in the private cloud, and when the terminal device 10 needs to store data to the public cloud, the terminal device 10 may transmit the data to the gateway 20 of the private cloud, and the gateway 20 processes the data and then sends the data to the public cloud.

The gateway 20 in the private cloud may be a storage gateway, which serves as a bridge between the private cloud and the public cloud. The gateway 20 is connected to the encryption chip 30, and the encryption chip 30 stores a key used for data encryption. In some embodiments, the encryption chip 30 may choose to use an USB key, and the USB key may be provided with a single-chip microcomputer or a smart card chip, which has a certain storage space and may store the key.

When the gateway 20 obtains to-be-stored data, the hybrid-cloud data storage method provided in this embodiment of this application may be used, and all or part of the to-be-stored data is encrypted by using the key provided by the encryption chip 30 (the encryption operation may be implemented by the encryption chip 30 or the gateway 20), so that the gateway 20 obtains an encrypted ciphertext, and may generate a data slice according to the target to-be-stored data including the ciphertext and transmit the data slice to the public cloud for storage.

The storage change server 40 in the public cloud may obtain the data slice transmitted by the gateway in the private cloud, and may perform storage change processing such as a protocol change on the data slice, to make the data conform to a protocol of the storage device, so that the storage change server 40 stores the processed data to the storage device 50.

The storage device 50 may be regarded as a data storage architecture, which preferably uses an object storage.

It can be seen that in this embodiment of this application, the gateway in the private cloud may be connected to the encryption chip, the encryption chip stores an encrypted key, and all or part of the to-be-stored data can be encrypted by using the key provided by the encryption chip, so that data stored in the public cloud includes the ciphertext encrypted by using the key provided by the encryption chip, thereby improving the security of the data stored in the public cloud. Moreover, the key used for encryption is stored in the encryption chip connected to the gateway in the private cloud, thereby reducing the hidden danger of the data being decrypted and leaked caused by the key being obtained by an administrator. Even if the public cloud is hacked and the data in the public cloud is leaked, the hidden danger of the data being decrypted and leaked will be reduced due to the lack of the key, thereby further improving the security of the data of the private cloud that is stored in the public cloud.

Figure 2A:
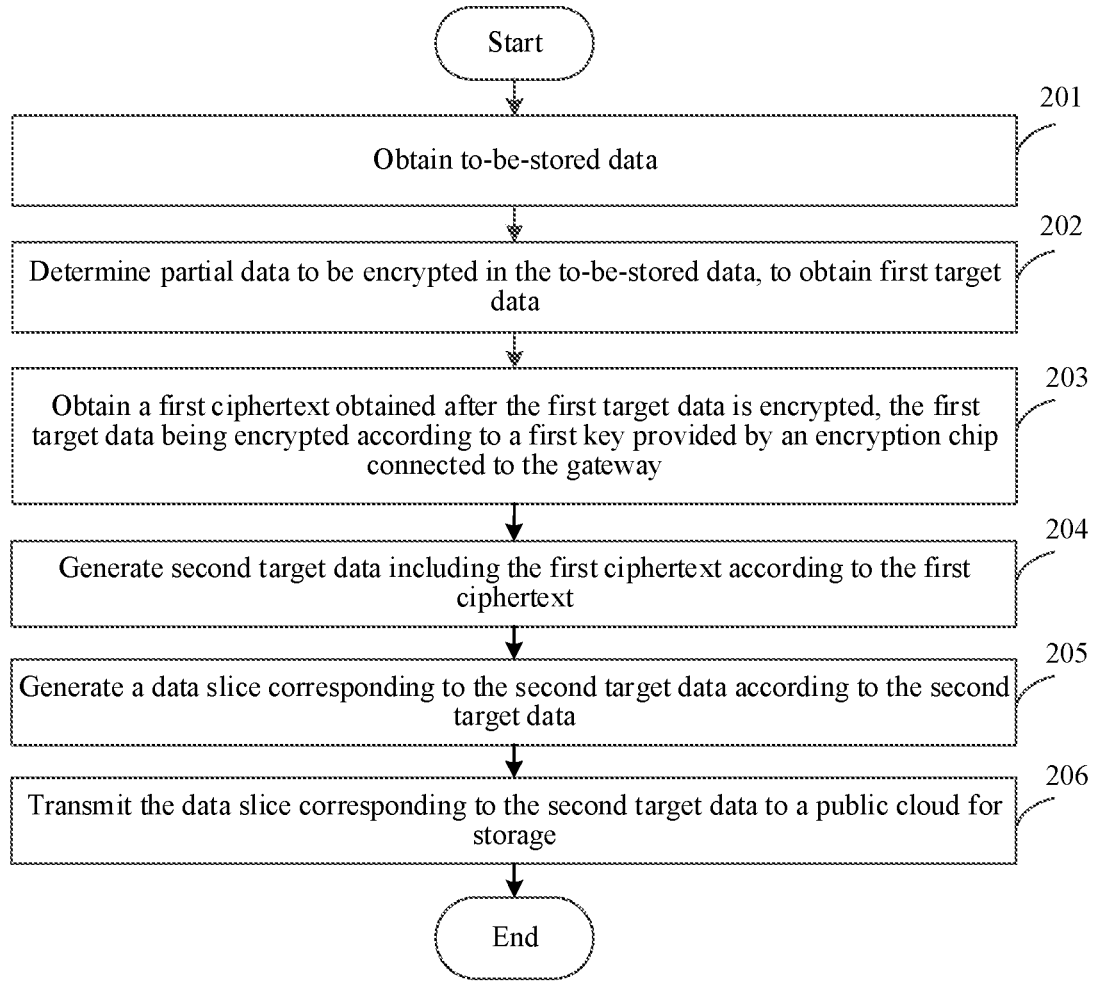
FIG. 2A is a flowchart of a hybrid-cloud data storage method according to an embodiment of this application.

Based on the cloud system shown in FIG. 1, the embodiments of this application provide a hybrid-cloud data storage method, applied to a gateway of a private cloud. FIG. 2A is a flowchart of a hybrid-cloud data storage method according to an embodiment of this application. As shown in FIG. 2A, the hybrid-cloud data storage method includes the following steps.

Step 201: Obtain to-be-stored data.

Step 202: Determine partial data to be encrypted in the to-be-stored data, to obtain first target data.

In some embodiments, a size of the partial data to be encrypted in the to-be-stored data is determined, and a corresponding position of the partial data to be encrypted in the to-be-stored data is determined. The partial data to be encrypted is determined from the to-be-stored data according to the size and the position, and the partial data is used as the first target data.

In some embodiments, during the determining of the corresponding position of the partial data to be encrypted in the to-be-stored data, a corresponding intra-block address offset of the partial data to be encrypted in the to-be-stored data is determined.

Step 203: Obtain a first ciphertext obtained after the first target data is encrypted, the first target data being encrypted according to a first key provided by an encryption chip connected to the gateway.

In some embodiments, the first target data is transmitted to the connected encryption chip, and the first ciphertext is obtained from the encryption chip. The first ciphertext is generated by the encryption chip by encrypting the target data according to the stored first key.

Step 204: Generate second target data including the first ciphertext according to the first ciphertext.

In some embodiments, the first ciphertext is overwritten to an original position of the first target data in the to-be-stored data according to the intra-block address offset, to obtain the second target data.

Step 205: Generate a data slice corresponding to the second target data according to the second target data.

Step 206: Transmit the data slice corresponding to the second target data to a public cloud for storage.

In some embodiments, a setting table may be further retrieved. The step of transmitting the first target data to the connected encryption chip is triggered to be performed, in a case that the setting table indicates that encryption is to be performed by the encryption chip.

In some embodiments, the determining a size of the partial data to be encrypted in the to-be-stored data includes: determining the size of the partial data to be encrypted in the to-be-stored data that is recorded in the setting table; and the determining a corresponding position of the partial data to be encrypted in the to-be-stored data includes: determining the corresponding position of the partial data to be encrypted in the to-be-stored data that is recorded in the setting table.

In some embodiments, the step of determining partial data to be encrypted in the to-be-stored data is triggered to be performed, in a case that the setting table indicates that the to-be-stored data is to be partially encrypted.

In some embodiments, a second ciphertext obtained after the to-be-stored data is encrypted is obtained, in a case that the setting table indicates that the to-be-stored data is to be completely encrypted. The to-be-stored data is encrypted according to a second key provided by the encryption chip connected to the gateway; and a data slice corresponding to the second ciphertext is generated according to the second ciphertext, and is transmitted to the public cloud for storage.

In some embodiments, the obtaining a second ciphertext obtained after the to-be-stored data is encrypted includes: determining whether the second key requested from the encryption chip last time is within a set life cycle; obtaining the second key in a case that the second key is within the set life cycle, and encrypting the to-be-stored data according to the second key, to obtain the second ciphertext; and requesting a third key from the encryption chip in a case that the second key is not within the set life cycle, and encrypting the to-be-stored data according to the requested third key, to obtain the second ciphertext.

In some embodiments, whether an address space of the obtained to-be-stored data corresponds to an address space of the to-be-stored data to be encrypted that is recorded in the setting table is determined; whether the obtained to-be-stored data needs to be encrypted is determined according to a storage frequency of the to-be-stored data to be encrypted that is recorded in the setting table; and the step of determining partial data to be encrypted in the to-be-stored data is triggered to be performed in a case that the determining results are both yes.

In some embodiments, the first key, the second key, and the third key may be the same key, or may be different keys with different key identifiers.

Figure 2B:
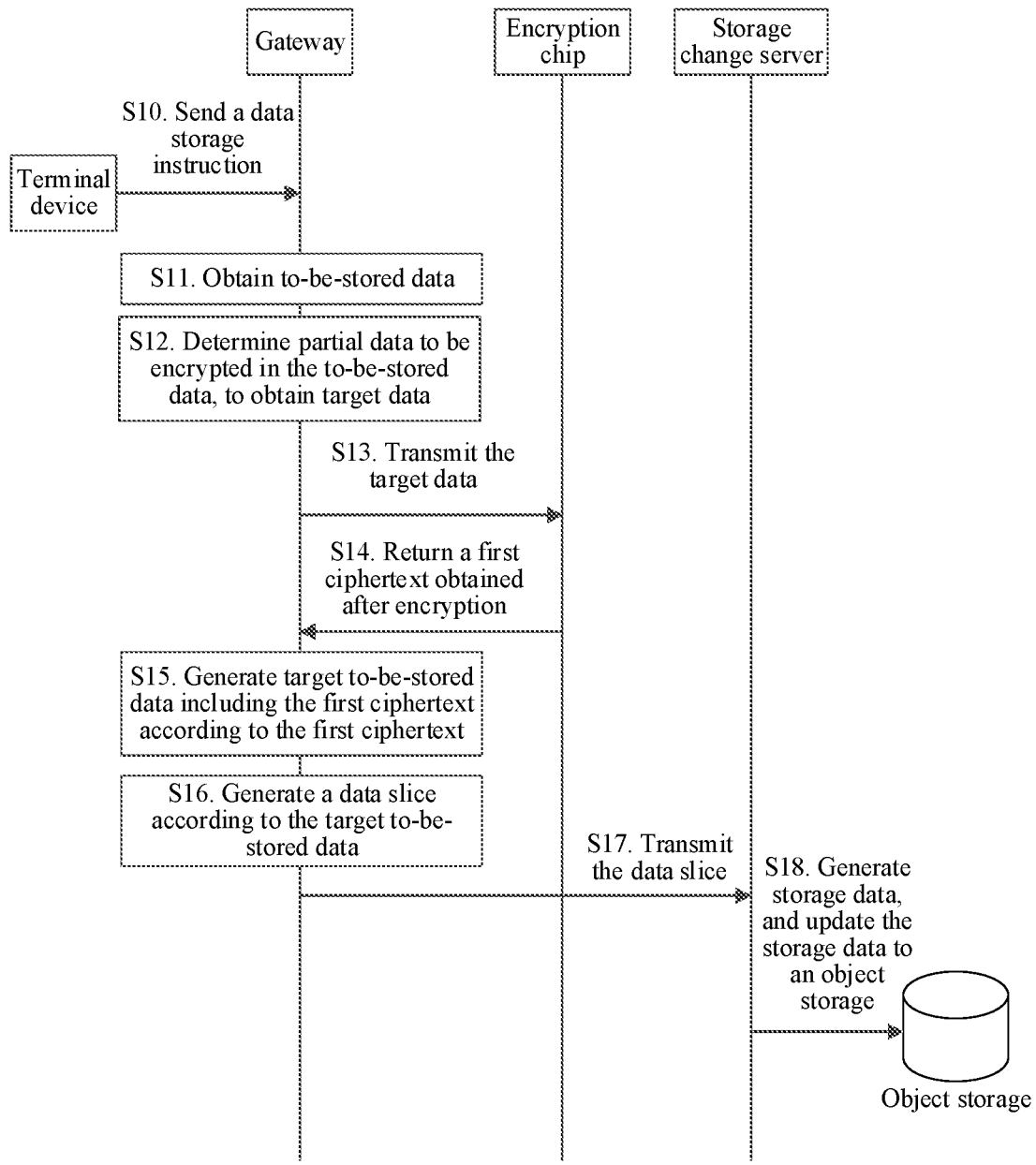
FIG. 2B is a signaling flowchart of the hybrid-cloud data storage method according to an embodiment of this application.

In this embodiment of this application, the gateway in the private cloud is connected to the encryption chip, the encryption chip stores an encrypted key, and all or part of the to-be-stored data can be encrypted by using the key provided by the encryption chip, so that data stored in the public cloud includes the ciphertext encrypted by using the key provided by the encryption chip, thereby improving the security of the data stored in the public cloud. Moreover, the key used for encryption is stored in the encryption chip connected to the gateway in the private cloud, thereby reducing the hidden danger of the data being decrypted and leaked caused by the key being obtained by an administrator. Even if the public cloud is hacked and the data in the public cloud is leaked, the hidden danger of the data being decrypted and leaked will be reduced due to the lack of the key, thereby further improving the security of the data of the private cloud that is stored in the public cloud. In this embodiment of this application, the to-be-stored data can be partially encrypted by the encryption chip connected to the gateway in the private cloud. Based on the cloud system shown in FIG. 1, FIG. 2B shows an optional signaling flowchart of the hybrid-cloud data storage method according to an embodiment of this application. Referring to FIG. 1 and FIG. 2B, the signaling flow may include the following steps.

Step S10: A terminal device in a private cloud sends a data storage instruction to a gateway of the private cloud, and the data storage instruction carries data to be stored.

In some embodiments, step S10 may be triggered by a user of the private cloud operating the terminal device. The user of the private cloud may specify data to be stored in the public cloud, and operate the terminal device to send the data storage instruction to the gateway of the private cloud, to instruct the gateway of the private cloud to store data to the public cloud. The data storage instruction may carry the data to be stored.

Step S11: The gateway of the private cloud obtains to-be-stored data.

In this embodiment of this application, data may be stored based on a data block. If the gateway of the private cloud receives large data to be stored, the data to be stored may be divided into a plurality of data blocks, and each data block is used as to-be-stored data. In this embodiment of this application, the size of the obtained data block may be 1 (mega). Obviously, the specific size of the data block may be adjusted and set according to an actual situation.

If the gateway of the private cloud receives small data to be stored, and such data is not enough to be divided into blocks, for example, data to be stored is only 5 k (bytes) in size, in this embodiment of this application, the data to be stored may be directly used as to-be-stored data.

In some embodiments, the gateway may provide a virtual iscsi (internet small computer system interface) block storage device to the outside, that is, a block storage volume is provided through an iscsi interface, and the block storage volume is a linear address space. That is, for the terminal device in the private cloud, the gateway of the private cloud may implement an iscsi target (iscsi storage device). From the perspective of the terminal device of the private cloud, the gateway may be an interface to a block storage device, and may virtualize a plurality of volumes for a plurality of terminal devices to use.

In some embodiments, the gateway may use the block storage volume provided by the iscsi interface to divide the data to be stored into blocks, to obtain the to-be-stored data.

The iscsi interface provided by the gateway may be similar to a block storage interface of a hard disk, and the block storage interface of the hard disk stores data according to sector numbers. For example, a 100 M (megabyte) file is first managed by a file system and finally stored in a set of sectors on the hard disk. This set of sectors may be continuous or discontinuous, and sectors in which the file is stored are determined by the file system. In this embodiment of this application, the virtual iscsi block storage device provided by the gateway of the private cloud to the outside implements a storage device at the same level as the hard disk and manages data blocks similar to the sectors. A data block of a normal hard disk is a sector, which is generally 512 K (bytes) in size. In this embodiment of this application, the gateway may divide the to-be-stored data into larger data blocks according to the setting for management, for example, 1M data blocks. The specific size of data blocks may be set according to an actual situation.

Step S12: The gateway determines partial data to be encrypted in the to-be-stored data, to obtain target data.

If the data to be stored is divided into a plurality of data blocks, in this embodiment of this application, each data block may be used as the to-be-stored data, and the partial data to be encrypted in each data block is determined, to obtain the target data. If the to-be-stored data is small, the data to be stored and that is sent by the terminal device may be directly used as the to-be-stored data, and in this embodiment of this application, the partial data to be encrypted in the to-be-stored data may be determined, to obtain the target data.

In some embodiments, in this embodiment of this application, encryption may be performed by the encryption chip connected to the gateway of the private cloud, and the encryption chip may encrypt part of the to-be-stored data.

Obviously, in this embodiment of this application, all the to-be-stored data may be encrypted. In some embodiments, whether the encryption chip encrypts all or part of the to-be-stored data may be recorded in the setting table of the gateway, and the content recorded in the setting table may be modified and adjusted by the user. If the setting table records that all the to-be-stored data is to be encrypted by the encryption chip, in this embodiment of this application, all the to-be-stored data may be encrypted. If the setting table records that part of the to-be-stored data is to be encrypted by the encryption chip, in this embodiment of this application, the partial data to be encrypted in the to-be-stored data may be determined, to obtain the target data.

Step S13: The gateway transmits the target data to the connected encryption chip.

In some embodiments, the gateway may be connected to the encryption chip through an USB, and the gateway may transmit the target data to the encryption chip through an USB communication protocol.

Step S14: The encryption chip encrypts the target data according to a stored key, and returns an encrypted first ciphertext to the gateway.

After obtaining the target data transmitted by the gateway, the encryption chip may encrypt the target data according to the key stored in the encryption chip, to obtain the encrypted first ciphertext. The encryption chip may feedback the encrypted first ciphertext to the gateway. The first ciphertext may be regarded as a ciphertext obtained after part of the to-be-stored data is encrypted.

The key may be regarded as a set of specific secret data. During encryption, the key controls an encryption algorithm to transform a plaintext into a corresponding ciphertext in a specified manner, and transforms a set of signal source identification information into unforgeable signature information. During decryption, the key controls a decryption algorithm to transform a ciphertext into a corresponding plaintext in a specified manner, and transforms the signature information into undeniable signal source evidence.

In some embodiments, the encryption algorithm used in this embodiment of this application may be set according to an actual situation.

Step S15: The gateway generates target to-be-stored data including the first ciphertext according to the first ciphertext.

In some embodiments, if the encryption chip encrypts part of the to-be-stored data, the encrypted first ciphertext is a result of encrypting part of the to-be-stored data. In this embodiment of this application, the first ciphertext may be overwritten to an original position of the target data in the to-be-stored data, thereby generating the target to-be-stored data including the first ciphertext.

Step S16: The gateway generates a data slice according to the target to-be-stored data.

In some embodiments, in this embodiment of this application, metadata of the target to-be-stored data may be determined, and the metadata is combined with the target to-be-stored data to generate a data slice. In some embodiments, in this embodiment of this application, the target to-be-stored data may be compressed and then be combined with the metadata to generate the data slice.

In some embodiments, the content of the metadata may include at least one of the following: indication information indicating whether to-be-stored data is a complete data block, an intra-block address offset, a data length of to-be-stored data, indication information indicating whether to-be-stored data is partially or completely encrypted, an internal offset of a ciphertext, a data length of a ciphertext, encryption mode indication information indicating whether encryption is performed by an encryption chip or a gateway, a key id or seed id of a current key, indication information of an encryption algorithm, indication information of a compression algorithm, and the like.

A key id (identification number) corresponds to a key currently used by an encryption chip, and a key stored in an encryption chip may correspond to a key id. A seed id corresponds to a seed used for generating a key, and a seed corresponds to a seed id.

Step S17: The gateway transmits the data slice to the public cloud.

In some embodiments, the gateway transmits the data slice to the public cloud for storage, and the storage change server in the public cloud may receive the data slice.

Step S18: The storage change server of the public cloud generates storage data according to the data slice, and updates the storage data to an object storage.

In some embodiments, depending on whether the to-be-stored data is a complete data block, processes of generating the storage data by the storage change server according to the data slice may be different. Whether the to-be-stored data is a complete data block may be determined according to whether to-be-stored data recorded in the metadata in the data slice is indication information of a complete data block.

If the to-be-stored data is a complete data block, the storage change server may directly combine the data slice with specific storage data content, to generate the storage data, so that the target to-be-stored data of the data slice in the storage data can be overwritten to the corresponding data previously stored in the object storage, and the corresponding metadata and the specific storage data content are recorded in the object storage.

In some embodiments, if the to-be-stored data is not a complete data block, for example, the to-be-stored data is only 5 k, and the data block does not meet the requirement of a size of 1M, the storage change server may retrieve at least one original data slice corresponding to the to-be-stored data from the storage device; decompress each retrieved original data slice one by one to obtain at least one original data block, combine the target to-be-stored data with the at least one original data block to obtain at least one data block to be stored, compress the at least one data block to be stored, combine the compressed data with the metadata to form a data slice, and combine the formed data slice with the specific storage data content to generate storage data, so as to update the storage data to the object storage.

In some embodiments, the storage change server may further change a protocol of the data slice to be consistent with a protocol of the storage device when the protocol of the data slice is inconsistent with the protocol of the storage device.

The storage device may allocate different blocks according to the address space of the data block when recording the storage data. A data block of the storage data corresponds to a file, and an identification value (bno) is used to identify a block number of the data block. bno is calculated by address and block size, for example, a size of 1M is 1 block, bno is 0 in the 0M to 1M bytes, bno is 1 in the 1M to 2M bytes, and so on. An address mod block size may be regarded as bno.

In some embodiments, the specific storage data content may include at least one of the following: data attributes (data block version numbers), and data head-fixed length (protocol versions, data block version numbers, and a quantity of slices).

Correspondingly, a structure of the storage data may be as follows:

data attributes, including version numbers of data blocks;
data head-fixed length, including protocol versions, data block version numbers, and a quantity of slices;
data slice-fixed length (namely metadata), including: indication information indicating whether to-be-stored data is a complete data block, an intra-block address offset, a data length of to-be-stored data, indication information indicating whether to-be-stored data is partially or completely encrypted, an internal offset of a ciphertext, a data length of a ciphertext, encryption mode indication information indicating whether encryption is performed by an encryption chip or a gateway, a key id or seed id of a current key, an encryption algorithm, a compression algorithm, and the like; and data slice-variable length, including specific data blocks.

It can be seen that, based on the signaling flow shown in FIG. 2, in this embodiment of this application, when data in the private cloud is stored in the public cloud, part of the to-be-stored data can be encrypted by using the key provided by the encryption chip connected to the gateway of the private cloud, so that the target to-be-stored data including the encrypted first ciphertext is stored in the public cloud. The target to-be-stored data includes the first ciphertext encrypted by using the key provided by the encryption chip, thereby improving the security of the data stored in the public cloud. Moreover, the key used for encryption is stored in the encryption chip, and the risk of key leakage is extremely low, thereby reducing the risk of data leakage caused by a cloud administrator leaking data, the public cloud being hacked, and the like, and improving the security of the data of the private cloud that is stored in the public cloud.

In some embodiments, in the signaling flow shown in FIG. 2, the encryption chip may encrypt part of the to-be-stored data, or may encrypt all the to-be-stored data. Preferably, since the encryption performance of the encryption chip may be poor, and the encryption chip may fail to encrypt all the to-be-stored data, in this embodiment of this application, preferably, the encryption chip may be used to encrypt part of the to-be-stored data. Obviously, this is only a preferred solution for the encryption operation performed by the encryption chip, and in this embodiment of this application, a case in which the encryption chip has sufficient encryption performance to encrypt all the to-be-stored data may exist.

Figure 3:
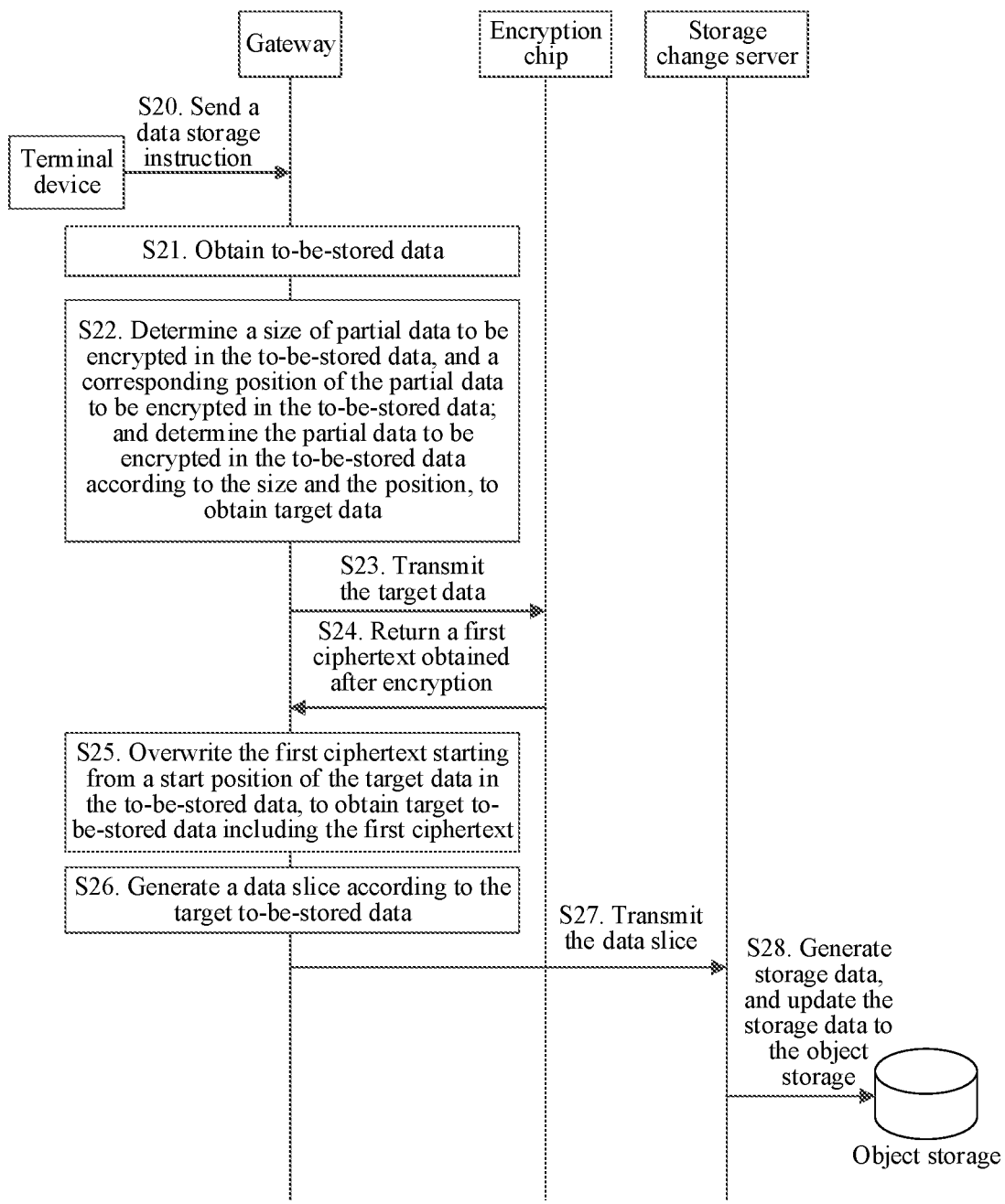
FIG. 3 is another signaling flowchart of the hybrid-cloud data storage method.

In some embodiments, FIG. 3 shows another optional signaling flow of the hybrid-cloud data storage method according to an embodiment of this application. Referring to FIG. 1 and FIG. 3, the signaling flow may include the following steps.

Step S20: A terminal device in a private cloud sends a data storage instruction to a gateway of the private cloud.

Step S21: The gateway of the private cloud obtains to-be-stored data.

Step S22: The gateway determines a size of partial data to be encrypted in the to-be-stored data, and determines a corresponding position of the partial data to be encrypted in the to-be-stored data; and determines the partial data to be encrypted in the to-be-stored data according to the size and the position, to obtain target data.

In some embodiments, in this embodiment of this application, the size of partial data to be encrypted in the to-be-stored data may be determined, and the corresponding position of the partial data to be encrypted in the to-be-stored data (for example, a corresponding intra-block address offset of the partial data to be encrypted in the to-be-stored data when the to-be-stored data is a data block) may be determined, so that the partial data to be encrypted may be determined from the to-be-stored data according to the set size of the partial data to be encrypted and the corresponding position of the partial data to be encrypted in the to-be-stored data, to obtain the target data.

In some embodiments, the size of the partial data to be encrypted and the corresponding position of the partial data to be encrypted in the to-be-stored data may be recorded in the setting table, and modified and adjusted by the user. For example, the setting table may record the size of the partial data to be encrypted, and the corresponding intra-block address offset of the partial data to be encrypted in the to-be-stored data. Correspondingly, in this embodiment of this application, the size of the partial data to be encrypted that is recorded in the setting table may be determined, and the corresponding position of the partial data to be encrypted in the to-be-stored data that is recorded in the setting table may be determined.

In some embodiments, the corresponding intra-block address offset of target data to be encrypted may be regarded as a start address of the target data (partial data) to be encrypted in the to-be-stored data. For example, if the size of to-be-stored data is 1M, and 2K target data in the 1M to-be-stored data is encrypted, a start address of the 2K target data in the to-be-stored data is regarded as a corresponding intra-block address offset of a first ciphertext obtained after the 2K target data is encrypted.

For example, when the to-be-stored data is a data block obtained through data block division processing, after the size of the partial data to be encrypted is set to 2 k (this value is only an optional example) and the corresponding intra-block address offset of the partial data to be encrypted is set, the gateway may select 2 k data as the partial data to be encrypted starting from the intra-block address offset in the to-be-stored data, to obtain the target data.

In some embodiments, in this embodiment of this application, the size of the partial data to be encrypted in the to-be-stored data, and the corresponding position of the partial data to be encrypted in the to-be-stored data may be randomly determined.

Step S23: The gateway transmits the target data to the connected encryption chip.

Step S24: The encryption chip encrypts the target data according to a stored key, and returns an encrypted first ciphertext to the gateway.

Step S25: The gateway overwrites the first ciphertext starting from a start position of the target data in the to-be-stored data, to obtain target to-be-stored data including the first ciphertext.

In some embodiments, after obtaining the first ciphertext, the gateway may determine the corresponding intra-block address offset of the partial data to be encrypted corresponding to the first ciphertext in the to-be-stored data, so that the gateway overwrites the first ciphertext to the original position of the target data in the to-be-stored data according to the intra-block address offset, to obtain the target to-be-stored data including the first ciphertext. That is, according to the intra-block address offset, the gateway overwrites the first ciphertext starting from the start position of the target data in the to-be-stored data, to obtain the target to-be-stored data including the first ciphertext.

Step S26: The gateway generates a data slice according to the target to-be-stored data.

In some embodiments, the metadata of the target to-be-stored data may be combined with the target to-be-stored data to generate the data slice. Reference may be made to the description above for the content of the metadata.

Step S27: The gateway transmits the data slice to a public cloud.

Step S28: A storage change server of the public cloud generates storage data according to the data slice, and updates the storage data to an object storage.

In some embodiments, the description of step S28 may be similar to that of step S18 shown in FIG. 2. If the to-be-stored data is not a complete data block, at least one original data block obtained from decompression of the original data slice is combined with the target to-be-stored data to obtain at least one data block to be stored, and the process may be as follows.

If there is no crossed encrypted data between the original data block obtained after each retrieved original data slice is decompressed one by one and the target to-be-stored data, the original data block and the target to-be-stored data can be combined into a complete data block. If there is crossed encrypted data between the original data block and the target to-be-stored data, an original data block including crossed encrypted data with the target to-be-stored data may be separated from the original data block, and an original data block without crossed encrypted data with the target to-be-stored data may be combined with the target to-be-stored data, so that the separated original data block and a data block obtained after combination are collected to obtain at least one data block to be stored.

Figure 4:
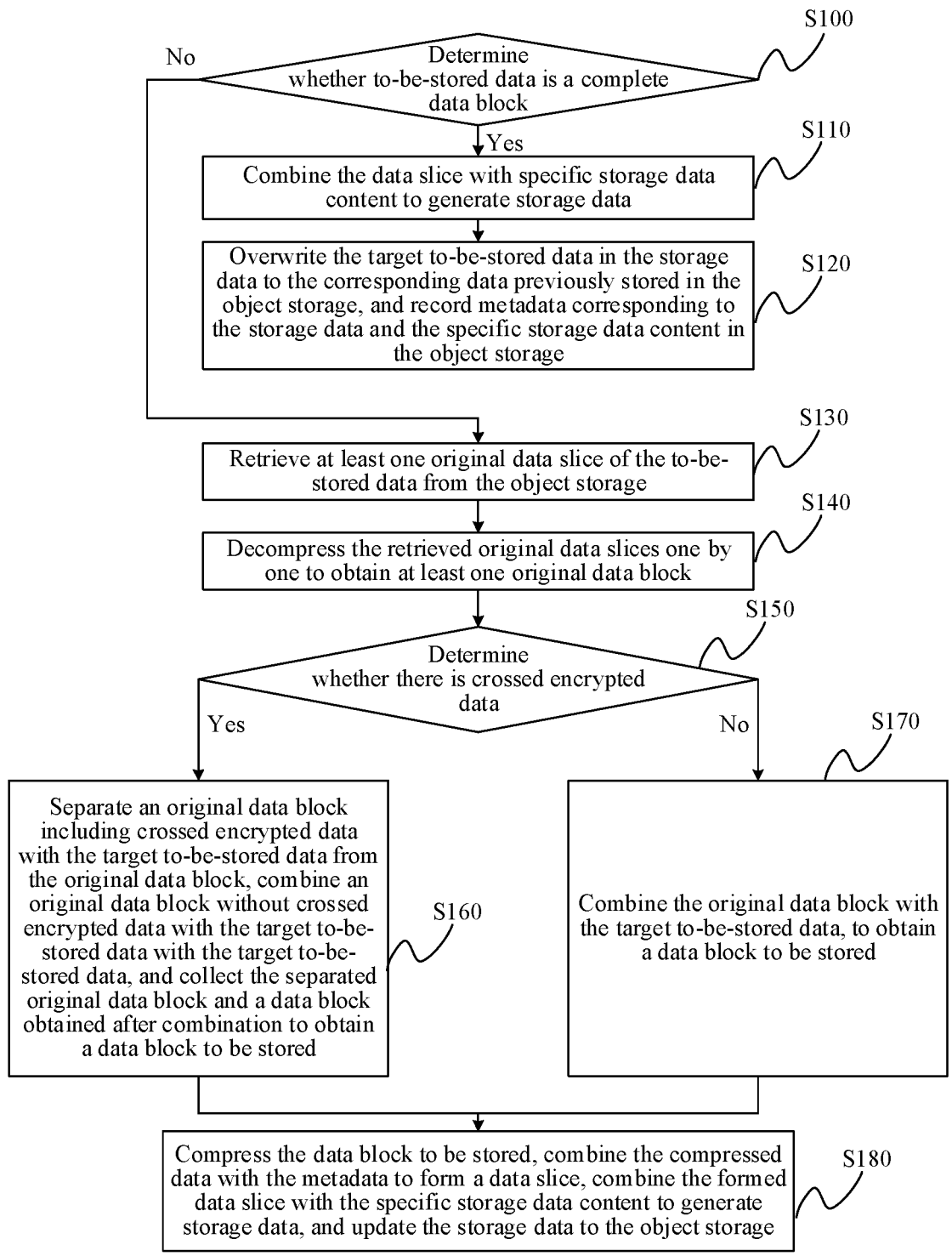
FIG. 4 is a flowchart of a method for generating storage data and updating the storage data to a storage object.

In some embodiments, the execution process of step S28 may be shown in FIG. 4 and includes the following steps.

Step S100: Determine whether to-be-stored data is a complete data block, and if yes, perform step S110, or if not, perform step S130.

In some embodiments, whether the to-be-stored data is a complete data block may be determined according to whether to-be-stored data recorded in the metadata in the data slice is indication information of a complete data block.

Step S110: Combine the data slice with specific storage data content to generate storage data.

In some embodiments, the data slice may include the target to-be-stored data and the corresponding metadata.

Step S120: Overwrite the target to-be-stored data in the storage data to the corresponding data previously stored in the object storage, and record the metadata corresponding to the storage data and the specific storage data content to the object storage.

Step S130: Retrieve at least one original data slice of the to-be-stored data from the object storage.

For example, if the to-be-stored data is 5K, and the object storage uses 1M data block for data storage, the original data slice corresponding to the 5K to-be-stored data and stored in the object storage with 1M data block may be retrieved from the object storage.

Step S140: Decompress the retrieved original data slices one by one to obtain at least one original data block.

Step S150: Determine whether there is crossed encrypted data between the original data block and the target to-be-stored data, and if yes, perform step S160, or if not, perform step S170.

In some embodiments, in this embodiment of this application, whether there is crossed encrypted data between the original data block and the target to-be-stored data may be determined according to an address space of encrypted data in the original data block, an address space of encrypted data in the target to-be-stored data, and a length of encrypted data. For example, if the address space of encrypted data in the target to-be-stored data is 4 to 7, and the address space of encrypted data in the original data block is 16 to 19, there is no crossed encrypted data. If the address space of encrypted data in the target to-be-stored data is 4 to 7, and the address space of encrypted data in the original data block is 6 to 9, there is crossed encrypted data.

Step S160: Separate an original data block including crossed encrypted data with the target to-be-stored data from the original data block, combine an original data block without crossed encrypted data with the target to-be-stored data with the target to-be-stored data, and collect the separated original data block and a data block obtained after combination to obtain a data block to be stored.

For example, if the target to-be-stored data is 5K data including 2K ciphertext, after the original data block is determined, the original data block that includes encrypted data and of which an address of encrypted data crosses an address of the 2K ciphertext may be separated and not be combined with the target to-be-stored data. The original data block that includes encrypted data and of which an address of encrypted data does not cross the address of the 2K ciphertext, or the original data block without encrypted data, may be combined with the target to-be-stored data, to obtain a data block after combination. Then, the separated original data block that includes crossed encrypted data and the data block after combination may be collected.

Step S170: Combine the original data block with the target to-be-stored data, to obtain a data block to be stored.

Step S180: Compress the data block to be stored, combine the compressed data with the metadata to form a data slice, combine the formed data slice with the specific storage data content to generate storage data, and update the storage data to the object storage.

Correspondingly, from the perspective of the gateway connected to the private cloud, the gateway may obtain target data to be encrypted in the to-be-stored data transmitted by the gateway, and encrypt the target data according to a key to obtain a first ciphertext; and output the first ciphertext to the gateway, so that the gateway determines data to be stored in the public cloud according to the first ciphertext (reference may be made to the subsequent processing after the gateway obtains the first ciphertext).

Figure 5:
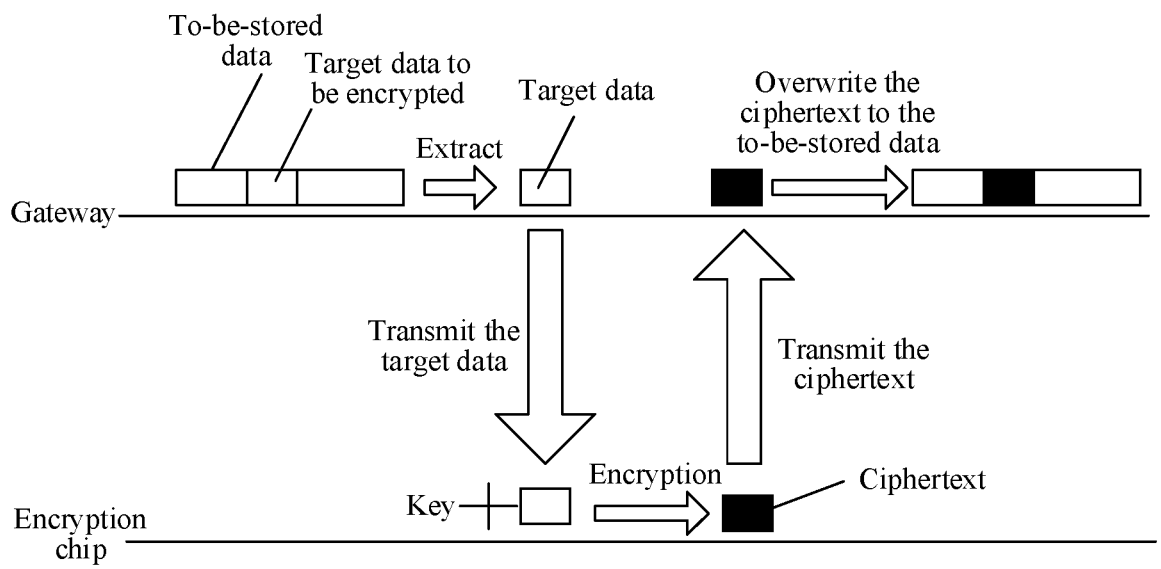
FIG. 5 is a schematic diagram of a gateway and an encryption chip interacting to implement partial data encryption.

From the perspective of the private cloud, when partial data is encrypted by the encryption chip, the interaction process between the encryption chip and the gateway may be shown in FIG. 5. The gateway may determine partial data to be encrypted in the to-be-stored data according to the set size of the partial data to be encrypted in the to-be-stored data and the corresponding position of the partial data to be encrypted in the to-be-stored data, to obtain target data; and transmit the target data to the encryption chip. The encryption chip encrypts the target data according to a stored key, and feeds back the first ciphertext to the gateway. The gateway may overwrite the ciphertext starting from the original position of the target data in the to-be-stored data according to the intra-block address offset, to obtain the target to-be-stored data including the first ciphertext, thereby implementing the effect of encrypting part of the to-be-stored data.

In some embodiments, in this embodiment of this application, the encryption operation may also be performed on the gateway in the private cloud. After the gateway obtains a key from the encryption chip once, the once-obtained key may maintain a set life cycle, and the gateway may use the key that is within the set life cycle for the encryption operation. The gateway may also obtain a key from the encryption chip for the encryption operation each time the data is stored, so as to use the key provided by the encryption chip to perform the encryption operation of the target data in the to-be-stored data.

Figure 6:
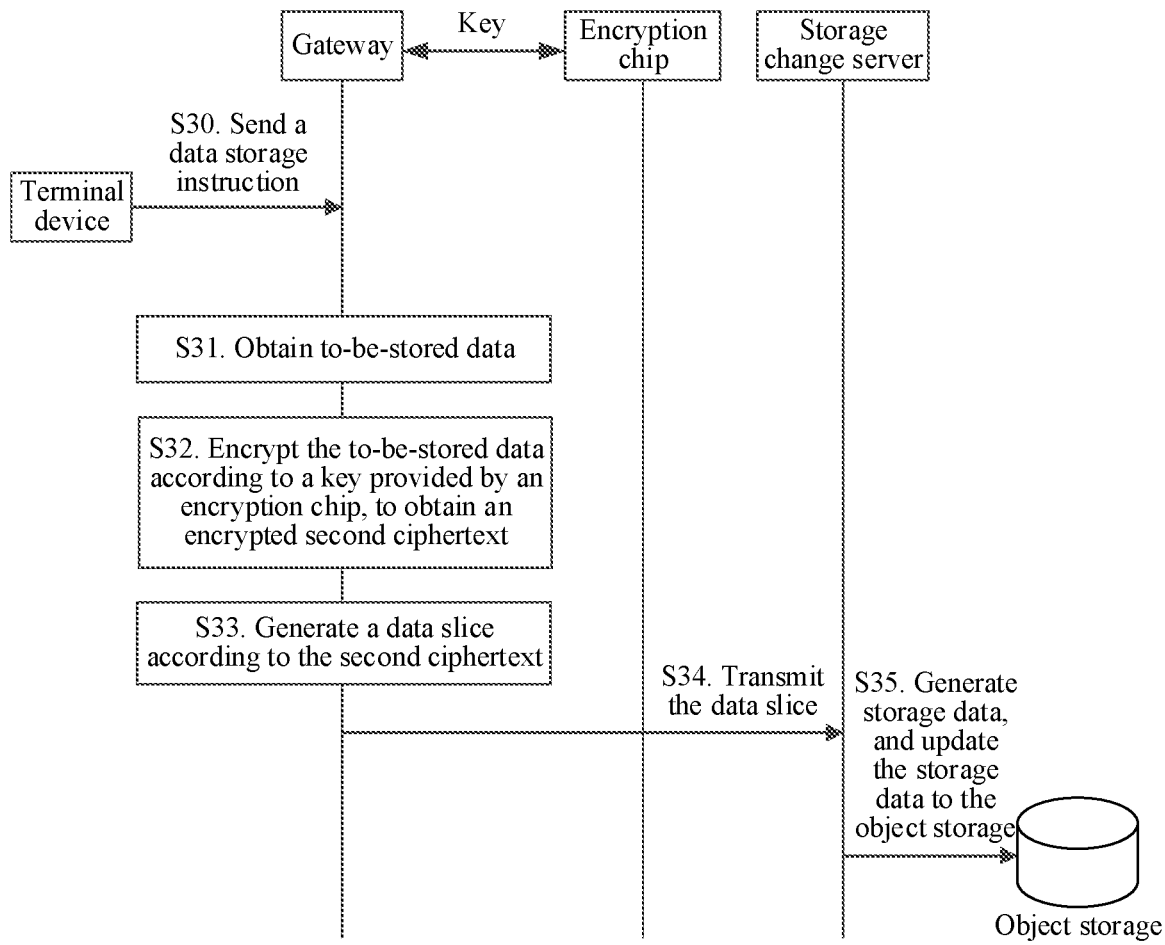
FIG. 6 is still another signaling flowchart of the hybrid-cloud data storage method.

In some embodiments, FIG. 6 shows still another optional signaling flow of the hybrid-cloud data storage method according to an embodiment of this application. Referring to FIG. 1 and FIG. 6, the signaling flow may include the following steps.

Step S30: A terminal device in a private cloud sends a data storage instruction to a gateway of the private cloud.

Step S31: The gateway of the private cloud obtains to-be-stored data.

Step S32: The gateway encrypts the to-be-stored data according to a key provided by an encryption chip, to obtain an encrypted second ciphertext.

In some embodiments, if the setting table indicates that all the to-be-stored data is to be encrypted, the to-be-stored data may be encrypted to obtain a second ciphertext. If the setting table indicates that part of the to-be-stored data is to be encrypted, partial data to be encrypted in the to-be-stored data may be determined according to the foregoing method content to obtain the target data, and the target data is encrypted by the gateway or the encryption chip to obtain a first ciphertext.

In some embodiments, the gateway may request a key from the connected encryption chip, so as to obtain the key provided by the encryption chip, and then use the key to encrypt the target data. This is a manner in which the gateway requests a key from the encryption chip each time the encryption operation is performed.

In some embodiments, in another manner, after the gateway requests a key from the encryption chip once, the requested key may maintain a set life cycle, and if the key requested from the encryption chip last time is still within the set life cycle, the gateway may encrypt the to-be-stored data according to the key requested from the encryption chip last time. In some embodiments, the key requested from the encryption chip last time may be stored in the gateway and remain valid within the set life cycle. If the set life cycle is exceeded, the gateway may request a key from the encryption chip again, and then encrypt the to-be-stored data according to the requested key to obtain a second ciphertext.

In some embodiments, the set life cycle maintained by the once-obtained key may be: a valid time set for the once-obtained key, or that the once-obtained key may support the gateway to read and write data for n times, where n is a set value, and may be set according to an actual situation.

In some embodiments, the key obtained by the gateway each time from the encryption chip may be consistent. Obviously, the encryption chip may also generate a dynamically changing key in a dynamic manner, but the key may correspond to a key id.

Step S33: The gateway generates a data slice according to the second ciphertext.

Step S34: The gateway transmits the data slice to a public cloud.

Step S35: A storage change server of the public cloud generates storage data according to the data slice, and updates the storage data to an object storage.

Preferably, the gateway may encrypt all the to-be-stored data. Obviously, all the to-be-stored data may also be encrypted by the encryption chip.

In some embodiments, the solution of encrypting part of or all the to-be-stored data by the encryption chip and the solution of encrypting part of or all the to-be-stored data by the gateway are described above, and these solutions may be parallel. In a case that the data stored in the public cloud is encrypted based on the key provided by the encryption chip connected to the gateway, one of the solutions may be used.

Obviously, in these solutions, the solution of encrypting part of the to-be-stored data by the encryption chip and the solution of encrypting all the to-be-stored data by the gateway may be preferably used.

In some embodiments, in a preferred solution, whether part of the to-be-stored data encrypted by the encryption chip or all the to-be-stored data encrypted by the gateway is selected may be recorded and adjusted by the setting table.

In some embodiments, in this embodiment of this application, the setting table may record at least one of the following:

indication information indicating whether to-be-stored data is partially or completely encrypted;

encryption mode indication information indicating whether encryption is performed by an encryption chip or a gateway;

a size of partial data to be encrypted, and a corresponding intra-block address offset of the partial data to be encrypted in the to-be-stored data in a case of partial encryption;

a key id in a case that the encryption chip performs encryption and indication information of an encryption algorithm, where, further, an administrator of the encryption chip may set the key id and the corresponding key on the encryption chip; and a seed id of the key generated in a case that the gateway performs encryption and indication information of an encryption algorithm, where, further, an administrator of the encryption chip may set the seed id and the corresponding seed on the encryption chip.

In some embodiments, the setting table may further record: indication information of a compression algorithm.

Figure 7:
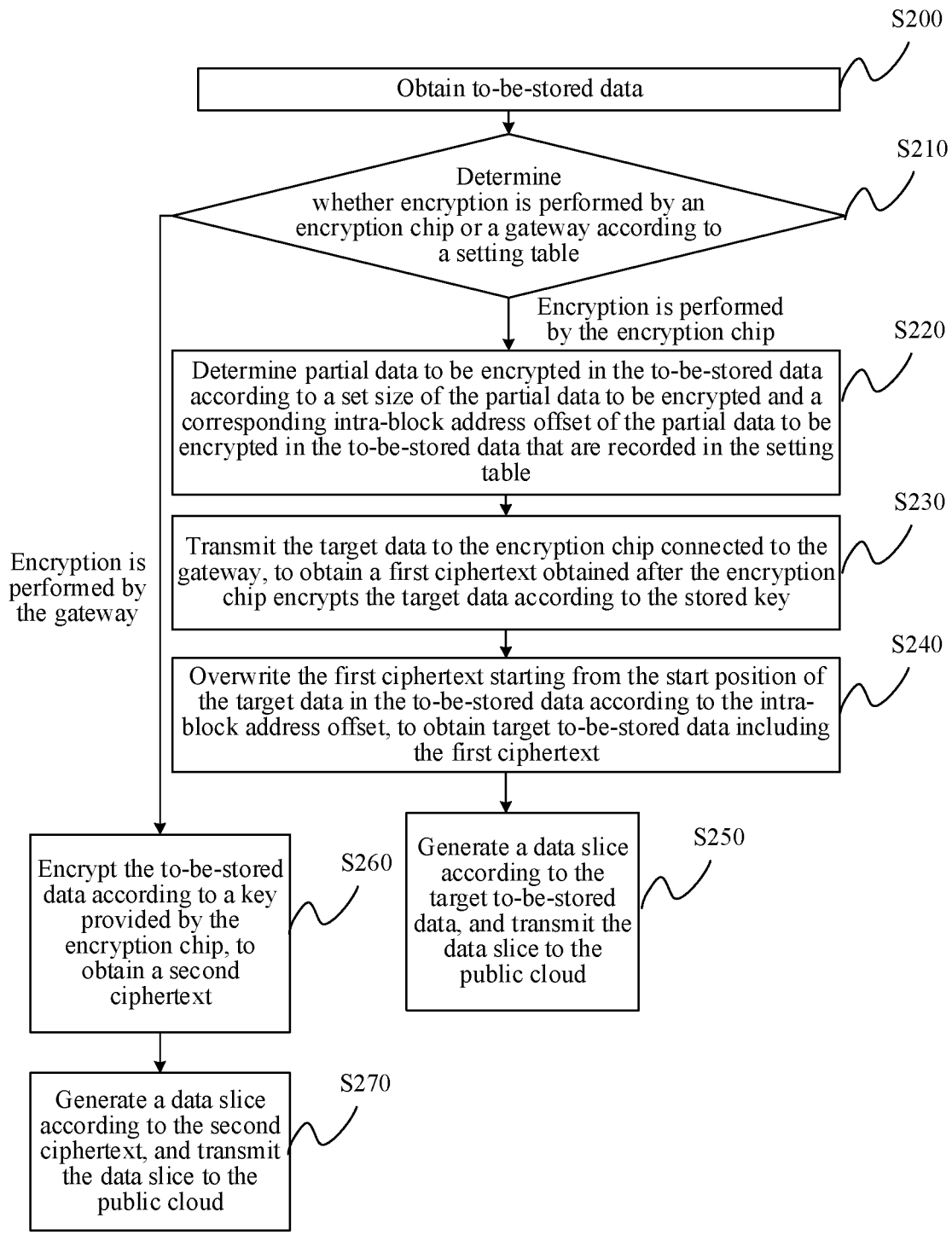
FIG. 7 is a flowchart of a hybrid-cloud data storage method according to an embodiment of this application.

In some embodiments, in a case that the solution of encrypting part of the to-be-stored data by the encryption chip and the solution of encrypting all the to-be-stored data by the gateway are both used, FIG. 7 shows a flow of the hybrid-cloud data storage method according to an embodiment of this application. The method may be applied to a gateway of a private cloud. Referring to FIG. 7, the method includes the following steps.

Step 200: Obtain to-be-stored data.

In some embodiments, the setting table may further record an address space of to-be-stored data to be encrypted (the address space of to-be-stored data may be determined by a block storage volume provided by an iscsi interface of the gateway, the storage volume corresponds to a linear address space, and each data block (a form of to-be-stored data) may correspond to an address space). If an address space of the obtained to-be-stored data corresponds to an address space of the to-be-stored data to be encrypted that is recorded in the setting table, the subsequent process of FIG. 7 may be performed; otherwise, the to-be-stored data may be stored in plaintext.

In some embodiments, the setting table may further record a storage frequency of to-be-stored data to be encrypted. For example, to-be-stored data is encrypted only once every set quantity of times, so that whether the obtained to-be-stored data needs to be encrypted may be determined according to the storage frequency of the to-be-stored data to be encrypted that is recorded in the setting table. If yes, the subsequent process of FIG. 7 may be performed; otherwise, the to-be-stored data may be stored in plaintext.

Further, whether the subsequent process of FIG. 7 needs to be performed based on the obtained to-be-stored data may be determined according to the address space of the to-be-stored data to be encrypted and the storage frequency of the to-be-stored data that are recorded in the setting table. If the address space of the obtained to-be-stored data corresponds to the address space of the to-be-stored data to be encrypted that is recorded in the setting table, and it is determined that the obtained to-be-stored data needs to be encrypted according to the storage frequency of the to-be-stored data to be encrypted that is recorded in the setting table, it may be determined that the subsequent process of FIG. 7 is performed; otherwise, the to-be-stored data may be stored in plaintext.

Step S210: Determine whether encryption is performed by the encryption chip or the gateway according to the encryption mode indication information recorded in the setting table. If encryption is performed by the encryption chip, step S220 is performed, and if encryption is performed by the gateway, step S260 is performed.

Step S220: Determine partial data to be encrypted in the to-be-stored data according to a set size of the partial data to be encrypted and a corresponding intra-block address offset of the partial data to be encrypted in the to-be-stored data that are recorded in the setting table, to obtain target data.

Step S230: Transmit the target data to the connected encryption chip, to obtain a first ciphertext obtained after the encryption chip encrypts the target data according to the stored key.

Step S240: Overwrite the first ciphertext starting from a start position of the target data in the to-be-stored data according to the intra-block address offset, to obtain target to-be-stored data including the first ciphertext.

Step S250: Generate a data slice according to the target to-be-stored data, and transmit the data slice to a public cloud.

Step S260: Encrypt the to-be-stored data according to a key provided by the encryption chip, to obtain a second ciphertext.

In some embodiments, in this of this application, part of the to-be-stored data is encrypted by the encryption chip, and all the to-be-stored data is encrypted by the gateway.

Step S270: Generate a data slice according to the second ciphertext, and transmit the data slice to the public cloud.

In some embodiments, the second ciphertext may be combined with the metadata to generate the data slice.

In some embodiments, further, the setting table may further record a quantity of times of read-write intervals for the gateway to obtain a key from the encryption chip. For example, the gateway obtains a key from the encryption chip every n times of reading and writing.

In this embodiment of this application, part of the to-be-stored data may be encrypted by the encryption chip according to the key, and all the to-be-stored data may be encrypted by the gateway according to the key provided by the encryption chip. Therefore, part of or all the to-be-stored data is encrypted, and the data including the encrypted ciphertext is stored in the public cloud.

The target to-be-stored data includes the ciphertext encrypted by using the key provided by the encryption chip, thereby improving the security of the data stored in the public cloud. Moreover, the key used for encryption is stored in the encryption chip, the risk of key leakage is extremely low, and there is basically no way to obtain the key after the encryption chip is disconnected from the gateway, thereby reducing the risk of data leakage caused by a cloud administrator leaking data, the public cloud being hacked, and the like, and further improving the security of the data of the private cloud that is stored in the public cloud.

Figure 8:
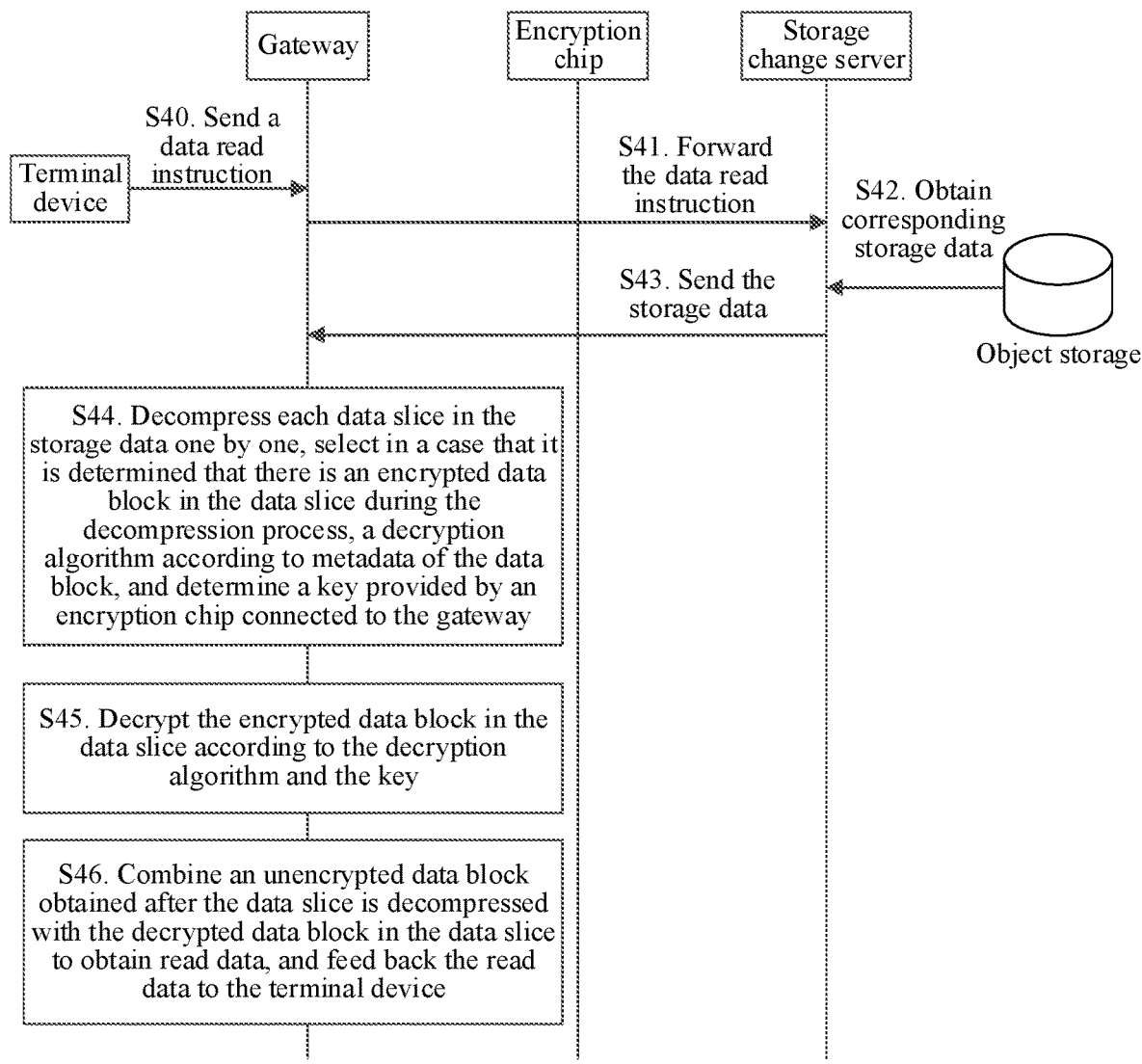
FIG. 8 is a signaling flowchart of a hybrid-cloud data reading method according to an embodiment of this application.

A signaling flow of a hybrid-cloud data reading method according to an embodiment of this application may be shown in FIG. 8. The data reading method may be implemented based on the data storage method described above. Referring to FIG. 8, the signaling flow may include the following steps.

Step S40: A terminal device in a private cloud sends a data read instruction to a gateway of the private cloud.

Step S41: The gateway forwards the data read instruction to a public cloud.

Step S42: A storage change server of the public cloud obtains storage data correspondingly stored in a storage device according to the data read instruction, the storage data including at least one data slice, and the at least one data slice including a data block correspondingly read by the data read instruction and metadata corresponding to the data block.

In some embodiments, the storage device reads data in the form of data blocks.

In some embodiments, the data block stored in the storage device (for example, an object storage) is represented by an identification value (bno), in this embodiment of this application, the data read instruction may carry indication information of an identification value (bno) of a data block to be read, so that the storage change server may obtain a corresponding value (data block) from the storage device according to the indication information of the identification value (bno), and then may obtain the storage data of the data slice including the obtained data block and the metadata corresponding to the data block from the storage device.

Step S43: The storage change server sends the storage data to the gateway of the private cloud.

Therefore, the gateway of the private cloud may obtain the storage data in the public cloud.

Step S44: The gateway of the private cloud decompresses each data slice in the storage data one by one, selects in a case that it is determined that there is an encrypted data block in the data slice during the decompression process, a decryption algorithm according to metadata of the data block, and determines a key provided by an encryption chip connected to the gateway.

In some embodiments, there is an encrypted data block in the data slice, and the data block may be partially or completely encrypted, which may be indicated by the metadata of the data block.

In some embodiments, the process of partially decrypting a data block may be the reverse of the process of partially encrypting a data block. If it is determines that partial data in a data block of a data slice is encrypted during the decompression process, a decryption algorithm may be selected according to the encryption algorithm recorded in the metadata of the data slice and a corresponding key provided by the encryption chip connected to the gateway may be obtained according to the key id recorded in the metadata, so that the partially encrypted target data in the data block of the data slice can be decrypted according to the selected decryption algorithm and the obtained key, and the decrypted target data can be overwritten to the original position of the target data in the data block according to the corresponding intra-block address offset, to obtain a decrypted data block corresponding to the data slice.

In a case that a data block of a data slice is completely encrypted, the data block of the data slice may be completely decrypted according to a decryption algorithm and a key determined by the metadata of the data slice, to obtain a decrypted data block corresponding to the data slice.

Step S45: The gateway decrypts the encrypted data block in the data slice according to the decryption algorithm and the key.

In some embodiments, the decryption operation can be implemented by the gateway.

Step S46: The gateway combines an unencrypted data block obtained after the data slice is decompressed with the decrypted data block in the data slice to obtain read data, and feeds back the read data to the terminal device.

In a case that the to-be-stored data is partially or completely encrypted, data reading may be regarded as the reverse of data storage, and mutual reference may be made to each other.

A hybrid-cloud data storage apparatus provided in the embodiments of this application is described below. The hybrid-cloud data storage apparatus described below may be regarded as a program module that needs to be set in the gateway of the private cloud in order to implement the hybrid-cloud data storage method provided in the embodiments of this application. Mutual reference may be correspondingly made to the content of the hybrid-cloud data storage apparatus described below and the content of the hybrid-cloud data storage method described above.

Figure 9:
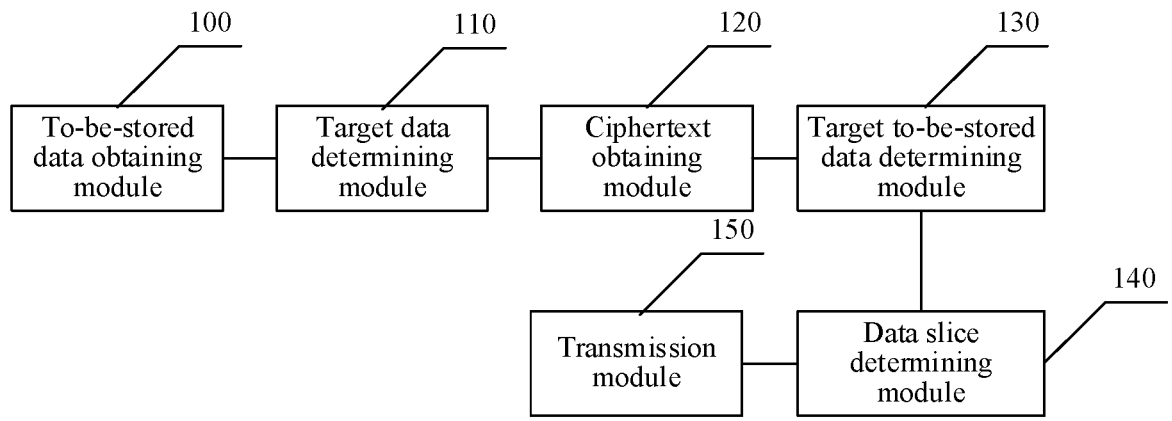
FIG. 9 is a structural block diagram of a hybrid-cloud data storage apparatus according to an embodiment of this application.

FIG. 9 is a structural block diagram of a hybrid-cloud data storage apparatus according to an embodiment of the present invention. The hybrid-cloud data storage apparatus may be applied to a gateway of a private cloud. Referring to FIG. 9, the hybrid-cloud data storage apparatus may include:

a to-be-stored data obtaining module 100, configured to obtain to-be-stored data;

a target data determining module 110, configured to determine partial data to be encrypted in the to-be-stored data, to obtain target data;

a ciphertext obtaining module 120, configured to obtain a first ciphertext obtained after the target data is encrypted, the target data being encrypted according to a key provided by an encryption chip connected to the gateway;

a target to-be-stored data determining module 130, configured to generate target to-be-stored data including the first ciphertext according to the first ciphertext;

a data slice determining module 140, configured to generate a data slice according to the target to-be-stored data; and a transmission module 150, configured to transmit the data slice to a public cloud for storage.

In some embodiments, the target data determining module 110 is configured to determine partial data to be encrypted in the to-be-stored data, to obtain target data, which specifically includes:

determining a size of the partial data to be encrypted in the to-be-stored data, and determining a corresponding position of the partial data to be encrypted in the to-be-stored data; and determining the partial data to be encrypted in the to-be-stored data according to the size and the position.

In some embodiments, the target data determining module 110 may determine a size of partial data to be encrypted in the to-be-stored data and that is recorded in a setting table, and determine a corresponding position of the partial data to be encrypted in the to-be-stored data and that is recorded in the setting table.

In some embodiments, the target data determining module 110 is configured to determine a corresponding position of partial data to be encrypted in the to-be-stored data, which specifically includes:

determining a corresponding intra-block address offset of the partial data to be encrypted in the to-be-stored data.

In some embodiments, the target to-be-stored data determining module 130 is configured to generate target to-be-stored data including the first ciphertext according to the first ciphertext, which specifically includes:

overwriting the first ciphertext to an original position of the target data in the to-be-stored data according to the intra-block address offset, to obtain the target to-be-stored data.

Figure 10:
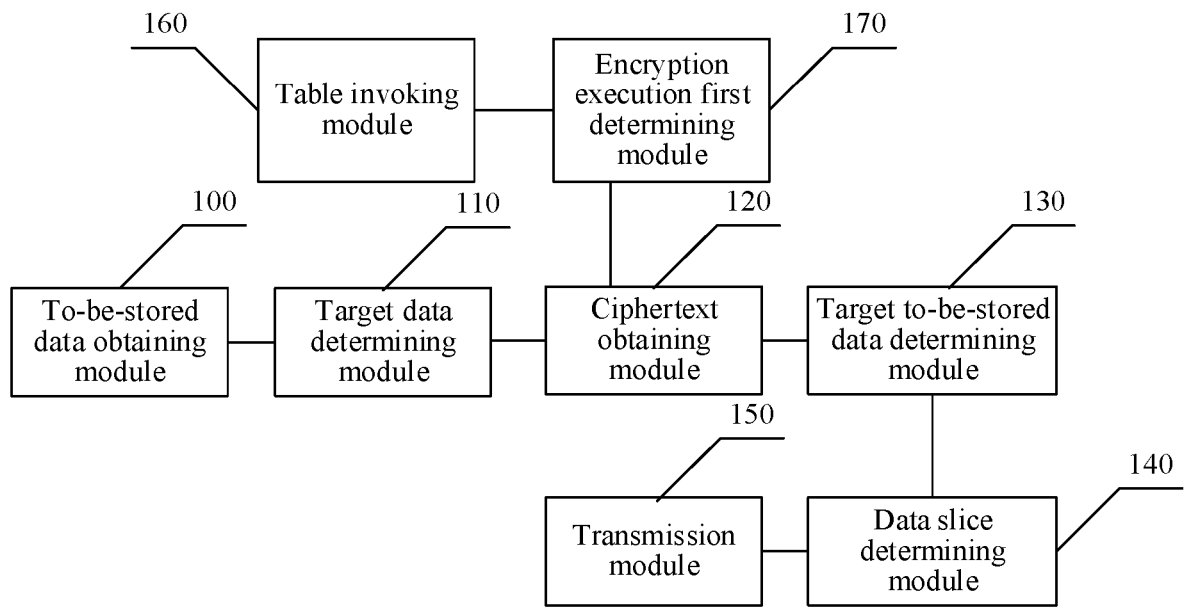
FIG. 10 is another structural block diagram of the hybrid-cloud data storage apparatus.

In some embodiments, the ciphertext obtaining module 120 is configured to obtain a first ciphertext obtained after the target data is encrypted, which specifically includes:

transmitting the target data to the connected encryption chip; and obtaining the first ciphertext obtained after the encryption chip encrypts the target data according to a stored key In some embodiments, FIG. 10 shows another structural block diagram of the hybrid-cloud data storage method according to an embodiment of this application. Referring to FIG. 9 and FIG. 10, the apparatus may further include.

a table retrieving module 160, configured to retrieve a setting table; and an encryption execution first determining module 170, configured to trigger the ciphertext obtaining module 120 to perform the operation of transmitting the target data to the connected encryption chip, in a case that the setting table indicates that encryption is to be performed by the encryption chip.

In some embodiments, the setting table further records at least one of the following:

indication information indicating whether to-be-stored data is partially or completely encrypted;

a size of partial data to be encrypted in the to-be-stored data, and a corresponding intra-block address offset of the partial data to be encrypted in the to-be-stored data;

a key id used by the encryption chip for encryption, and indication information of an encryption algorithm;

a seed id of a key generated when the gateway uses the key provided by the encryption chip for encryption, and indication information of an encryption algorithm;

indication information of a compression algorithm; and a quantity of times of read-write intervals for the gateway to obtain a key from the encryption chip.

In some embodiments, the data storage apparatus may be further configured to:

trigger the target data determining module 110 to perform the operation of determining partial data to be encrypted in the to-be-stored data, in a case that the setting table indicates that the to-be-stored data is to be partially encrypted.

In some embodiments, the data storage apparatus may be further configured to:

obtain a second ciphertext obtained after the to-be-stored data is encrypted, in a case that the setting table indicates that the to-be-stored data is to be completely encrypted, the to-be-stored data being encrypted according to a key provided by the encryption chip connected to the gateway; and generate a data slice according to the second ciphertext, and transmit the data slice to the public cloud for storage.

In some embodiments, the data storage apparatus is configured to obtain a second ciphertext obtained after the to-be-stored data is encrypted, which specifically includes:

obtaining a key provided by the encryption chip; and encrypting the to-be-stored data according to the key, to obtain the second ciphertext.

In some embodiments, the data storage apparatus is configured to obtain a key provided by the encryption chip, which specifically includes:

determining whether the key requested from the encryption chip last time is within a set life cycle;

obtaining the key requested from the encryption chip last time, in a case that the key requested from the encryption chip last time is within the set life cycle; and requesting a key from the encryption chip, in a case that the key requested from the encryption chip last time is not within the set life cycle.

In some embodiments, the data slice determining module 140 is configured to generate a data slice according to the target to-be-stored data, which specifically includes:

determining metadata of the target to-be-stored data, and combining the metadata with the target to-be-stored data to generate the data slice.

In some embodiments, the metadata may include at least one of the following:

indication information indicating whether to-be-stored data is a complete data block, an intra-block address offset, a data length of to-be-stored data, indication information indicating whether to-be-stored data is partially or completely encrypted, an internal offset of a ciphertext, a data length of a ciphertext, encryption mode indication information indicating whether encryption is performed by an encryption chip or a gateway, a key id or seed id of a current key, indication information of an encryption algorithm, and indication information of a compression algorithm.

Figure 11:
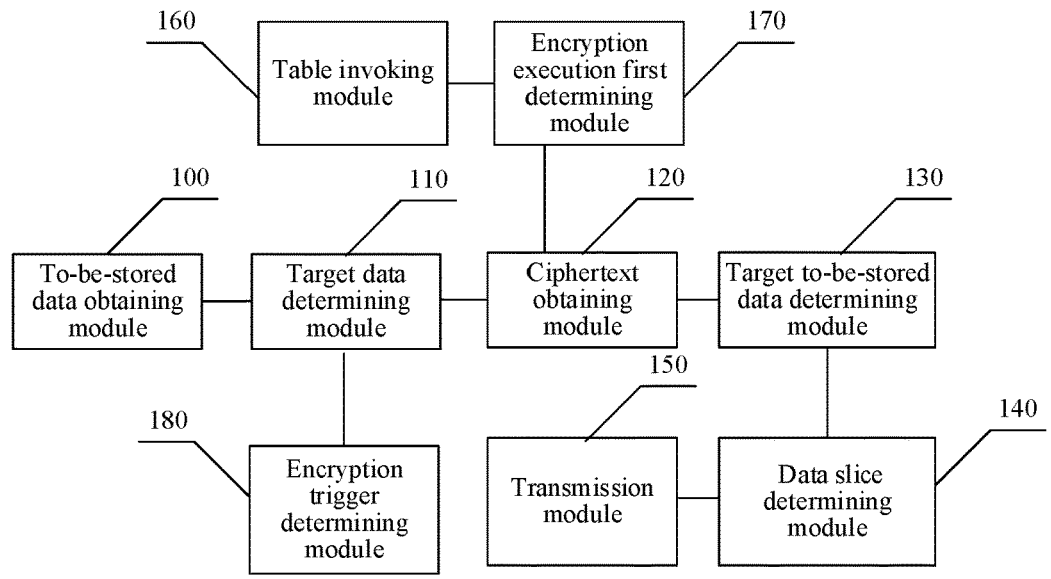
FIG. 11 is still another structural block diagram of the hybrid-cloud data storage apparatus.

In some embodiments, the setting table further records an address space of the to-be-stored data to be encrypted, and a storage frequency of the to-be-stored data to be encrypted. Referring to FIG. 10 and FIG. 11, the hybrid-cloud data storage apparatus provided in this embodiment of this application that is shown in FIG. 11 may further include:

an encryption trigger determining module 180, configured to determine whether an address space of the obtained to-be-stored data corresponds to an address space of the to-be-stored data to be encrypted that is recorded in the setting table; and determine, according to a storage frequency of the to-be-stored data to be encrypted that is recorded in the setting table, whether the obtained to-be-stored data needs to be encrypted; and the target data determining module 110 being triggered to perform the operation of determining partial data to be encrypted in the to-be-stored data, in a case that an address space of the obtained to-be-stored data corresponds to an address space of the to-be-stored data to be encrypted that is recorded in the setting table, and it is determined, according to a storage frequency of the to-be-stored data to be encrypted that is recorded in the setting table, that the obtained to-be-stored data needs to be encrypted.

Figure 12:
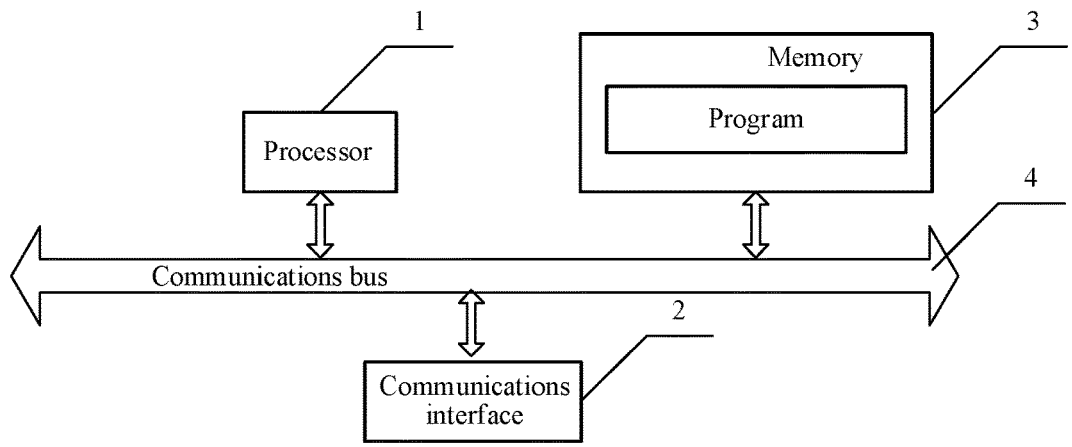
FIG. 12 is a block diagram of a hardware structure of a gateway.

An embodiment of this application further provides a gateway of a private cloud, and a block diagram of a hardware structure of the gateway may be shown in FIG. 12 and includes at least one processor 1, at least one communications interface 2, at least one memory 3, and at least one communications bus 4.

In this embodiment of this application, a quantity of each of the processors 1, the communications interfaces 2, the memories 3, and the communications buses 4 is at least one, and communication among the processor 1, the communications interface 2, and the memory 3 is implemented by using the communications bus 4.

In some embodiments, the communication interface 2 may be an interface of a communications module, for example, an interface of a GSM module.

The processor 1 may be a central processing unit (CPU), or an application-specific integrated circuit (ASIC), or is configured as one or more integrated circuits implementing the embodiments of this application.

The memory 3 may include a high-speed RAM memory, or may also include a non-volatile memory, for example, at least one magnetic disk storage.

The memory 3 stores a program, and the processor 1 invokes the program stored in the memory 3. The program is specifically used for:

obtaining to-be-stored data;

determining partial data to be encrypted in the to-be-stored data, to obtain target data;

obtaining a first ciphertext obtained after the target data is encrypted, the target data being encrypted according to a key provided by an encryption chip connected to the gateway;

generating target to-be-stored data including the first ciphertext according to the first ciphertext;

generating a data slice according to the target to-be-stored data; and transmitting the data slice to a public cloud for storage.

An embodiment of this application may further provide a storage medium. The storage medium may be in the form of a memory, and applied to a gateway of a private cloud. The storage medium may record a program, and the program may be used for:

obtaining to-be-stored data;

determining partial data to be encrypted in the to-be-stored data, to obtain target data;

obtaining a first ciphertext obtained after the target data is encrypted, the target data being encrypted according to a key provided by an encryption chip connected to the gateway;

generating target to-be-stored data including the first ciphertext according to the first ciphertext;

generating a data slice according to the target to-be-stored data; and transmitting the data slice to a public cloud for storage.

In some embodiments, the function refinement and extended functions of the program may be described with reference to the corresponding sections above.

An embodiment of this application further provides an encryption chip. The encryption chip may include at least one memory and at least one processor, the memory stores a program, the processor invokes the program, and the program is used for:

obtaining target data to be encrypted in to-be-stored data transmitted by a gateway of a private cloud;

encrypting the target data according to a key, to obtain a first ciphertext; and outputting the first ciphertext to the gateway, so that the gateway determines data to be stored in a public cloud according to the first ciphertext.

An embodiment of this application further provides a hybrid-cloud data reading apparatus. The hybrid-cloud data reading apparatus may be regarded as a program module that needs to be set in a gateway of a private cloud in order to implement the hybrid-cloud data reading method provided in the embodiments of this application. Mutual reference may be correspondingly made to the hybrid-cloud data reading apparatus described below and the hybrid-cloud data reading method described above.

Figure 13:
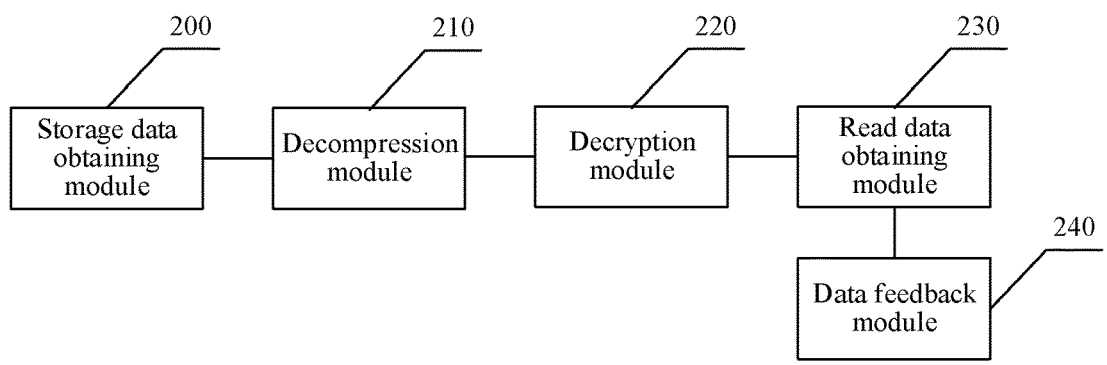
FIG. 13 is a structural block diagram of a hybrid-cloud data reading apparatus according to an embodiment of this application.

FIG. 13 is a structural block diagram of a hybrid-cloud data reading apparatus according to an embodiment of the present invention. The apparatus may be applied to a gateway of a private cloud. Referring to FIG. 13, the hybrid-cloud data reading apparatus may include:

a storage data obtaining module 200, configured to obtain storage data in a public cloud, the storage data including at least one data slice, and the at least one data slice including a data block to be read and metadata corresponding to the data block;

a decompression module 210, configured to decompress each data slice in the storage data one by one, select, in a case that it is determined that there is an encrypted data block in the data slice during the decompression process, a decryption algorithm according to metadata of the data block, and determine a key provided by an encryption chip connected to the gateway;

a decryption module 220, configured to decrypt the encrypted data block in the data slice according to the decryption algorithm and the key;

a read data obtaining module 230, configured to combine an unencrypted data block obtained after the data slice is decompressed with the decrypted data block in the data slice, to obtain read data; and a data feedback module 240, configured to feed back the read data to a terminal device.

In some embodiments, the decryption module 220 is configured to decrypt the encrypted data block in the data slice according to the decryption algorithm and the key, which specifically includes:

decrypting, in a case that partial data in the data block of the data slice is encrypted, the partially encrypted target data in the data block of the data slice according to the selected decryption algorithm and the obtained key, and overwriting the decrypted target data to the original position of the target data in the data block according to the corresponding intra-block address offset, to obtain a corresponding decrypted data block.

In some embodiments, the hybrid-cloud data reading apparatus described above may be loaded in the gateway of the private cloud in the form of a program module. Correspondingly, a structure of the gateway may be shown in FIG. 12 and includes at least one processor 1, at least one communications interface 2, at least one memory 3, and at least one communications bus 4.

The memory stores a program, and the processor invokes the program. The program is used for:

obtaining storage data in a public cloud, the storage data including at least one data slice, and the at least one data slice including a data block to be read and metadata corresponding to the data block;

decompressing each data slice in the storage data one by one, selecting, in a case that it is determined that there is an encrypted data block in the data slice during the decompression process, a decryption algorithm according to metadata of the data block, and determining a key provided by an encryption chip connected to the gateway;

decrypting the encrypted data block in the data slice according to the decryption algorithm and the key;

combining an unencrypted data block obtained after the data slice is decompressed with the decrypted data block in the data slice, to obtain read data; and feeding back the read data to a terminal device.

An embodiment of this application further provides a cloud system, and a structure of the cloud system may be shown in FIG. 1. The cloud system includes: at least one terminal device, a gateway, and an encryption chip connected to the gateway, which are located in a private cloud; and a storage change server and a storage device, which are located in a public cloud.

The gateway is configured to obtain to-be-stored data; determine partial data to be encrypted in the to-be-stored data, to obtain target data; obtain a first ciphertext obtained after the target data is encrypted, the target data being encrypted according to a key provided by an encryption chip connected to the gateway; generate target to-be-stored data including the first ciphertext according to the first ciphertext; generate a data slice according to the target to-be-stored data; and transmit the data slice to the public cloud for storage.

The storage change server is configured to generate storage data according to the data slice, and update the storage data to an object storage.

In some embodiments, the storage change server is configured to generate storage data according to the data slice, which specifically includes:

combining the data slice with specific storage data content to generate storage data, in a case that the to-be-stored data is a complete data block; and in a case that the to-be-stored data is not a complete data block, retrieving at least one original data slice corresponding to the to-be-stored data from the storage device; decompressing each retrieved original data slice one by one to obtain at least one original data block, and combining the target to-be-stored data with the at least one original data block to obtain at least one data block to be stored; compressing the at least one data block to be stored, combining the compressed data with the metadata to form a data slice, and combining the formed data slice with the specific storage data content, to generate storage data.

In some embodiments, the storage change server is configured to combine the target to-be-stored data with the at least one original data block, to obtain at least one data block to be stored, which specifically includes:

determining whether there is crossed encrypted data between the original data block and the target to-be-stored data;

if yes, separating an original data block including crossed encrypted data with the target to-be-stored data from the original data block, combining an original data block without crossed encrypted data with the target to-be-stored data with the target to-be-stored data, and collecting the separated original data block and a data block obtained after combination to obtain a data block to be stored.

if not, combining the original data block with the target to-be-stored data, to obtain a data block to be stored.

In some embodiments, the gateway is further configured to: obtain storage data in a public cloud, the storage data including at least one data slice, and the at least one data slice including a data block to be read and metadata corresponding to the data block; decompress each data slice in the storage data one by one, select, in a case that it is determined that there is an encrypted data block in the data slice during the decompression process, a decryption algorithm according to metadata of the data block, and determine a key provided by an encryption chip connected to the gateway; decrypt the encrypted data block in the data slice according to the decryption algorithm and the key; combine an unencrypted data block obtained after the data slice is decompressed with the decrypted data block in the data slice, to obtain read data; and feedback the read data to a terminal device.

In the embodiments of this application, part of or all the to-be-stored data can be encrypted by using the key provided by the encryption chip connected to the gateway of the private cloud, so that the data including the encrypted ciphertext is stored in the public cloud. Because the target to-be-stored data includes the ciphertext encrypted by using the key provided by the encryption chip, and the key used for encryption is stored in the encryption chip, the risk of key leakage is extremely low, thereby reducing the risk of data leakage caused by a cloud administrator leaking data, the public cloud being hacked, and the like, and improving the security of the data of the private cloud that is stored in the public cloud.

The embodiments in this specification are all described in a progressive manner. Description of each of the embodiments focuses on differences from other embodiments, and reference may be made to each other for the same or similar parts among respective embodiments. The apparatus disclosed by the embodiments is corresponding to the method disclosed by the embodiments and therefore is only briefly described, and reference may be made to the descriptions of the method for the associated part.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has described compositions and steps of each example in general according to functions. Whether these functions are executed in the manner of hardware or software depends on specific applications and design constraints of the technical solutions. A person skilled in the art may use different methods to implement the described functions for each particular application, but it is not to be considered that the implementation goes beyond the scope of this application.

The steps of the method or algorithm according to the embodiments disclosed in this specification can be implemented by hardware or a software module executed by a processor, or implemented by a combination thereof. The software module may be set in a random access memory (RAM), an internal memory, a read-only memory, an electrically programmable ROM, an electrically erasable and programmable ROM, a register, a hard disk, a removable hard disk, a CD-ROM, or any storage medium in other forms well-known in the art.

The foregoing descriptions of the disclosed embodiments enable a person skilled in the art to implement or use this application. Various modifications to the embodiments are obvious to the person skilled in the art, and general principles defined in this specification may be implemented in other embodiments without departing from the spirit or scope of the present invention. Therefore, this application will not be limited to the embodiments described in this specification but extends to the widest scope that complies with the principles and novelty disclosed in this specification.

What is claimed is:

1. A hybrid-cloud data storage method, applied to a gateway having one or more processors and memory storing a plurality of programs to be executed by the one or more processors, the method comprising:
   obtaining a setting table specifying an encryption mode and size and offset information for partial data encryption prior to transmission to a public cloud storage, wherein the size and offset information corresponds to an encryption performance of an encryption chip coupled to the gateway;
   obtaining data to be stored in the public cloud storage;
   identifying, in accordance with the size and offset information from the setting table, a portion of the data to be encrypted, wherein the portion of the data to be encrypted is a subset of the data to be stored in the public cloud storage;
   identifying a remaining portion of the data to be stored in the public cloud storage, wherein the remaining portion is not to be encrypted prior to transmission to the public cloud storage;
   in accordance with the encryption mode, obtaining an encryption key provided by the encryption chip;
   obtaining a ciphertext by encrypting the portion of the data to be encrypted using the encryption key;
   generating a data slice using the ciphertext and the remaining portion of the data; and
   transmitting the data slice to the public cloud storage.

2. The hybrid-cloud data storage method according to claim 1, wherein the portion of the data to be encrypted is identified in accordance with the setting table indicating that the data is to be partially encrypted.

3. The hybrid-cloud data storage method according to claim 1, wherein the obtaining the encryption key comprises:
   determining whether a key previously requested from the encryption chip is within a set life cycle;
   assigning the previously-requested key as the encryption key in a case that the previously-requested key is within the set life cycle;
   requesting another key from the encryption chip in a case that the previously-requested key is not within the set life cycle, and assigning the another key as the encryption key.

4. The hybrid-cloud data storage method according to claim 1, further comprising:
   determining whether an address space of the obtained data corresponds to an address space that is referenced in the setting table;
   determining, according to a storage frequency of the data that is referenced in the setting table, whether the obtained data should be encrypted; and
   triggering, in a case that the determining results are both yes, the operation of identifying the portion of the data to be encrypted.

5. The method of claim 1, wherein the setting table is stored at the gateway; and
   wherein content recorded in the setting table is modifiable by a user of the gateway.

6. The method of claim 1, wherein the setting table further includes a quantity of times of read-write intervals for the gateway to obtain a key from the encryption chip.

7. The method of claim 1, wherein the setting table includes encryption mode information specifying whether encryption operations are to be performed at the gateway or at the encryption chip.

8. The method of claim 1, wherein generating the data slice comprises:
   generating compressed data by compressing the first ciphertext and the remaining portion of the data using a compression algorithm; and
   combining the compressed data with metadata.

9. The method of claim 8, wherein the metadata includes one or more of: indication information indicating whether data is a complete data block, an intra-block address offset, a data length of data, indication information indicating whether the data is partially or completely encrypted, an internal offset of the first ciphertext, a data length of the first ciphertext, encryption mode indication information indicating whether encryption was performed by an encryption chip or a gateway, an identifier corresponding to the first key, indication information of an encryption algorithm, and indication information of the compression algorithm.

10. The method of claim 8, wherein the setting table further includes information indicating the compression algorithm, and wherein the compressed data is generated using the compression algorithm in accordance with the information indicating the compression algorithm.

11. The method of claim 1, wherein the setting table further includes indication information of an encryption algorithm.

12. The method of claim 11, wherein:
the setting table further includes key information including at least one of: a key identifier, and a seed identifier; and
the key information is editable by an administrator of the encryption chip.

13. A gateway comprising one or more processors, memory coupled to the one or more processors and a plurality of programs stored in the memory that, when executed by the one or more processors, cause the gateway to perform a plurality of operations comprising:
obtaining a setting table specifying an encryption mode and size and offset information for partial data encryption prior to transmission to a public cloud storage, wherein the size and offset information corresponds to an encryption performance of an encryption chip coupled to the gateway;
obtaining data to be stored in the public cloud storage;
identifying, in accordance with the size and offset information from the setting table, a portion of the data to be encrypted, wherein the portion of the data to be encrypted is a subset of the data to be stored in the public cloud storage;
identifying a remaining portion of the data to be stored in the public cloud storage, wherein the remaining portion is not to be encrypted prior to transmission to the public cloud storage;
in accordance with the encryption mode, obtaining an encryption key provided by the encryption chip;
obtaining a ciphertext by encrypting the portion of the data to be encrypted using the encryption key;
generating a data slice using the ciphertext and the remaining portion of the data; and
transmitting the data slice to the public cloud storage.

14. The gateway according to claim 13, wherein
the portion of the data to be encrypted is identified in accordance with the setting table indicating that the data is to be partially encrypted.

15. The gateway according to claim 13, wherein the plurality of operations further comprise:
determining whether a key previously requested from the encryption chip is within a set life cycle;
assigning the previously-requested key as the encryption key in a case that the previously-requested key is within the set life cycle; and
requesting another key from the encryption chip in a case that the previously-requested key is not within the set life cycle, and assigning the another key as the encryption key.

16. The gateway according to claim 13, wherein the plurality of operations further comprise:
determining whether an address space of the obtained data corresponds to an address space that is referenced in the setting table;
determining, according to a storage frequency of the data that is referenced in the setting table, whether the obtained data should be encrypted; and
triggering, in a case that the determining results are both yes, the operation of identifying the portion of the data to be encrypted.

17. A non-transitory computer readable storage medium storing a plurality of machine-readable instructions in connection with a gateway having one or more processors, wherein the plurality of machine readable instructions, when executed by the one or more processors, cause the gateway to perform a plurality of operations including:
obtaining a setting table specifying an encryption mode and size and offset information for partial data encryption prior to transmission to a public cloud storage, wherein the size and offset information corresponds to an encryption performance of an encryption chip coupled to the gateway;
obtaining data to be stored in the public cloud storage;
identifying, in accordance with the size and offset information from the setting table, a portion of the data to be encrypted, wherein the portion of the data to be encrypted is a subset of the data to be stored in the public cloud storage;
identifying a remaining portion of the data to be stored in the public cloud storage, wherein the remaining portion is not to be encrypted prior to transmission to the public cloud storage;
in accordance with the encryption mode, obtaining an encryption key provided by the encryption chip;
obtaining a ciphertext by encrypting the portion of the data to be encrypted using the encryption key;
generating a data slice using the ciphertext and the remaining portion of the data; and
transmitting the data slice to the public cloud storage.

* * * * *